US011683504B2

(12) United States Patent
Wu et al.

(10) Patent No.: US 11,683,504 B2
(45) Date of Patent: *Jun. 20, 2023

(54) METHOD AND APPARATUS IN VIDEO CODING WITH FLEXIBLE CODING ORDER

(71) Applicant: Tencent America LLC, Palo Alto, CA (US)

(72) Inventors: Yeqing Wu, Sunnyvale, CA (US); Xiaozhong Xu, State College, PA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,217

(22) Filed: May 11, 2022

(65) Prior Publication Data

US 2022/0272360 A1    Aug. 25, 2022

Related U.S. Application Data

(63) Continuation of application No. 16/844,058, filed on Apr. 9, 2020, now Pat. No. 11,363,279.

(Continued)

(51) Int. Cl.
*H04N 19/105* (2014.01)
*H04N 19/176* (2014.01)

(52) U.S. Cl.
CPC ......... *H04N 19/176* (2014.11); *H04N 19/105* (2014.11)

(58) Field of Classification Search
CPC .................. H04N 19/176; H04N 19/105
(Continued)

(56) References Cited

U.S. PATENT DOCUMENTS

2016/0227244 A1    8/2016  Rosewarne
2016/0337661 A1*  11/2016  Pang ................... H04N 19/57
(Continued)

FOREIGN PATENT DOCUMENTS

EP      3300362 A1    3/2018
WO   2012095035 A1    7/2012
(Continued)

OTHER PUBLICATIONS

International Search Report and Written Opinion dated Jul. 6, 2020 in International Application No. PCT/JS2020/027620 (10 pages).
(Continued)

*Primary Examiner* — Ayman A Abaza
(74) *Attorney, Agent, or Firm* — ArentFox Schiff LLP

(57) ABSTRACT

An apparatus includes processing circuitry, which determines a block vector that points to a reference block in a same picture as a current block in an intra block copy mode. The current block is one of a plurality of coding blocks in a coding tree block (CTB) with a right to left coding order being allowed within the CTB. The processing circuitry checks that two corner samples of the reference block have been reconstructed based on first outputs from a derivation process for block availability. The processing circuitry checks that a non corner sample of the reference block has been reconstructed based on a second output from the derivation process. The processing circuitry encodes the current block based on reconstructed samples of the reference block after a determination that the two corner samples of the reference block and the non corner sample of the reference block have been reconstructed.

20 Claims, 19 Drawing Sheets

Related U.S. Application Data

(60) Provisional application No. 62/834,335, filed on Apr. 15, 2019.

(58) Field of Classification Search
USPC .................................................. 375/240.13
See application file for complete search history.

(56) References Cited

U.S. PATENT DOCUMENTS

| | | | |
|---|---|---|---|
| 2018/0255295 A1 | 9/2018 | Lee et al. | |
| 2020/0099928 A1 | 3/2020 | Piao et al. | |
| 2021/0105464 A1* | 4/2021 | Choi | H04N 19/82 |

FOREIGN PATENT DOCUMENTS

| | | |
|---|---|---|
| WO | 2018117891 A1 | 6/2018 |
| WO | 2020184990 A1 | 9/2020 |
| WO | WO-2020184990 A1 * | 9/2020 |

OTHER PUBLICATIONS

ITU-T Telecommunication Union, Telecommunication Standardization Sector of ITU, "High Efficiency Video Coding H.265", Series H: Audiovisual and Multimedia Systems Infrastructure of audiovisual services—Coding of moving video, Dec. 2016 (664 pages).

Xiaozhong Xu et al., "Intra Block Copy in HEVC Screen Content Coding Extensions", IEEE Journal on Emerging and Selected Topics in Circuits and Systems, vol. 6, Issue 6, Dec. 2016 (11 pages).

Shan Liu et al., "Overview of HEVC Extensions on Screen Content Coding", APSIPA Transactions on Signal and Information Processing, 4, Sep. 22, 2015 (12 pages).

Rajan Joshi et al., High Efficiency Video Coding (HEVC) Screen Content Coding: Draft 6, Joint Collaborative Team on Video Coding (JCT-VC) of ITU-T SG 16 WP 3 and ISO/IEC JTC 1/SC 29/WG 11, JCTVC-W1005-v4, 23rd Meeting: San Diego, USA, Feb. 19-26, 2016 (673 pages).

Yinji Piao et al., "CE1.4: Split Unit Coding Order", Joint Video Experts Team (JVET) of ITU-T SG 16 WP 3 and ISO/IEC JTC 1/SC 29/WG 11, JVET-K0133-v2, 11th Meeting: Ljubljana, SI, Jul. 10-18, 2018 (5 pages).

Xiaozhong Xu et al., "CE8: CPR mode with local search ranges (Test CE8.3.1 and CE8.3.2)", Joint Video Experts Team (JVET) of ITU-T SG 16 WP 3 and ISO/IEC JTC 1/SC 29/WG 11, JVET-L0293-v2, 12th Meeting: Macao, CN, Oct. 3-12, 2018 (5 pages).

Xiaozhong Xu et al., "CE8-related: CPR mode with local search range optimization", Joint Video Experts Team (JVET) of ITU-T SG 16 WP 3 and ISO/IEC JTC 1/SC 29/WG 11, JVET-L0297-v1, 12th Meeting: Macao, CN, Oct. 3-12, 2018 (6 pages).

Benjamin Bross et al., "Versatile Video Coding (Draft 3)", Joint Video Experts Team (JVET) of ITU-T SG 16 WP 3 and ISO/IEC JTC 1/SC 29/WG 11, JVET-L1001-v7, 12th Meeting: Macao, CN, Oct. 3-12, 2018 (25 pages).

Xiaozhong Xu et al., "Non-CE8: IBC search range adjustment for implementation consideration", Joint Video Experts Team (JVET) of ITU-T SG 16 WP 3 and ISO/IEC JTC 1/SC 29/WG 11, JVET-N0383-v1, 14th Meeting: Geneva, CH, Mar. 19-27, 2019 (3 pages).

Supplementary European Search Report dated Jun. 3, 2022 in Application No. 20789814.9, pp. 1-12.

Yeqing Wu et al: "Intra Block Copy for EVC", 126. MPEG Meeting; Mar. 25, 2019-Mar. 29, 2019; Geneva; (Motion Picture Expert Group or ISO/IEC JTC1/SC29/WG11), No. m47940, Mar. 23, 2019, pp. 1-213.

Xu X et al: "Non-CE8: Constraints on IBC reference block locations", 16. JVET Meeting; Oct. 1, 2019-Oct. 11, 2019; Geneva; (The Joint Video Exploration Team of ISO/IEC JTC1/SC29/WG11 and ITU-T SG.16 ), No. JVET-P0454 ; m50422, Oct. 10, 2019, pp. 1-4.

Piao Y et al: "CE1-related : Split Unit Coding Order", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0063, Oct. 1, 2018, pp. 1-6.

* cited by examiner

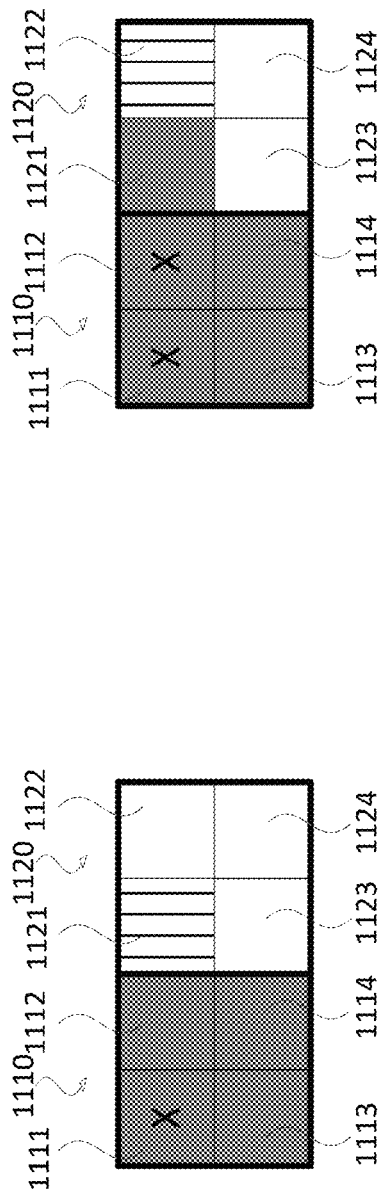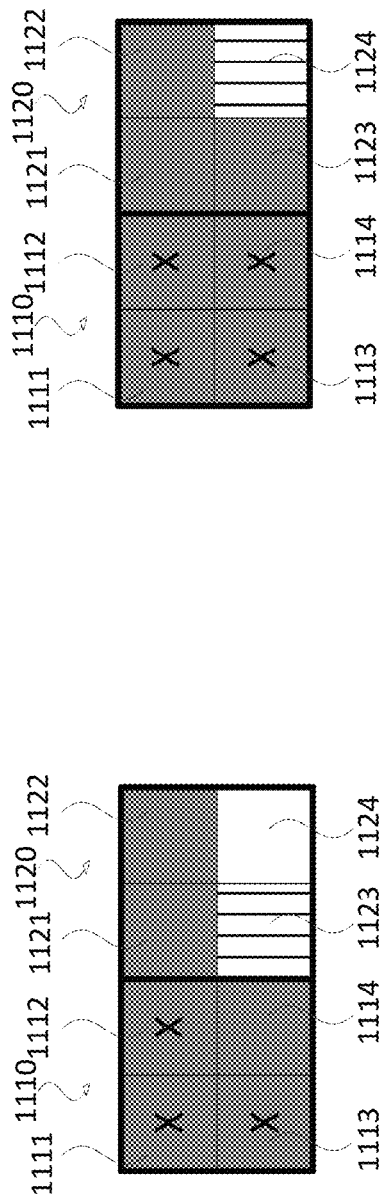

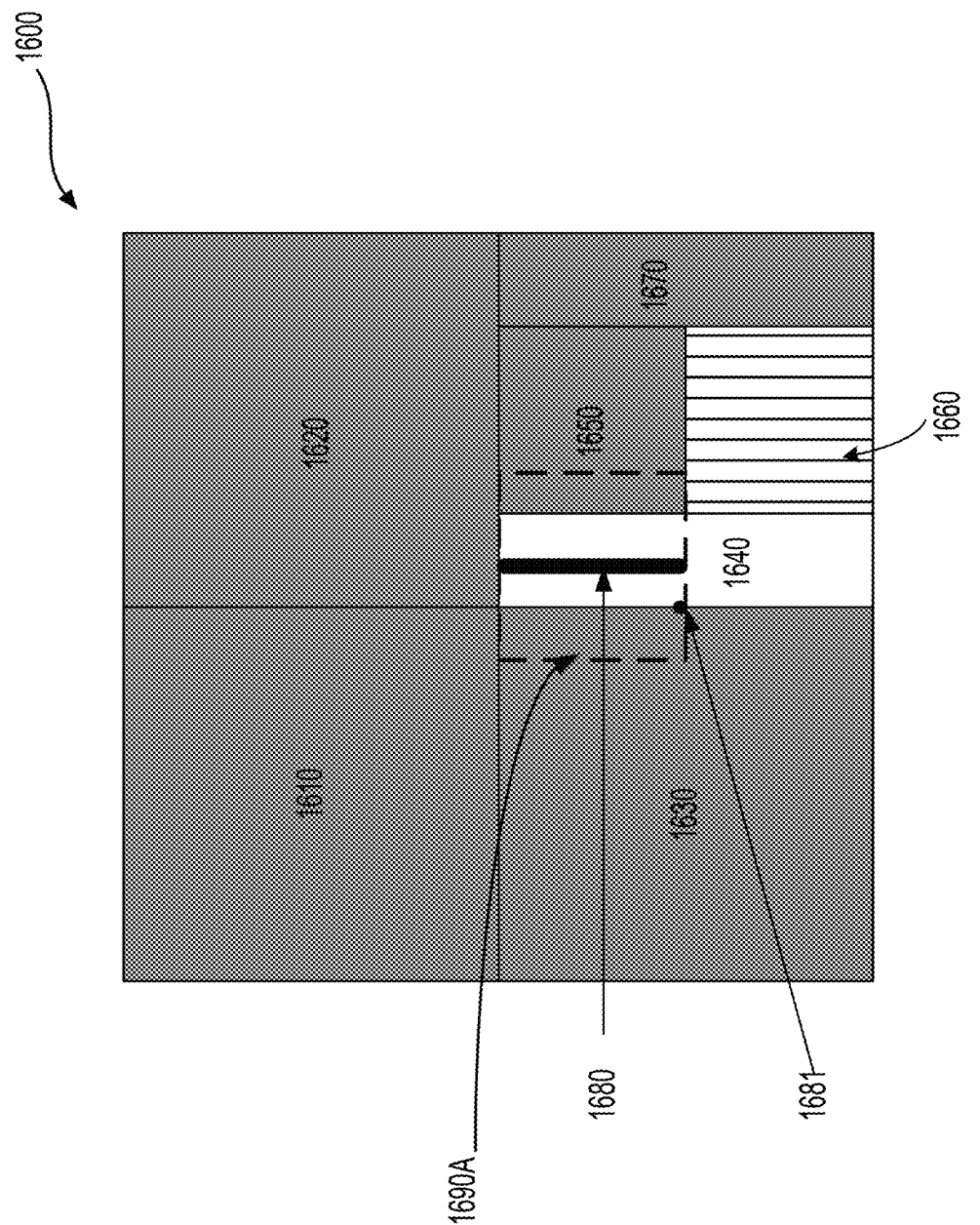

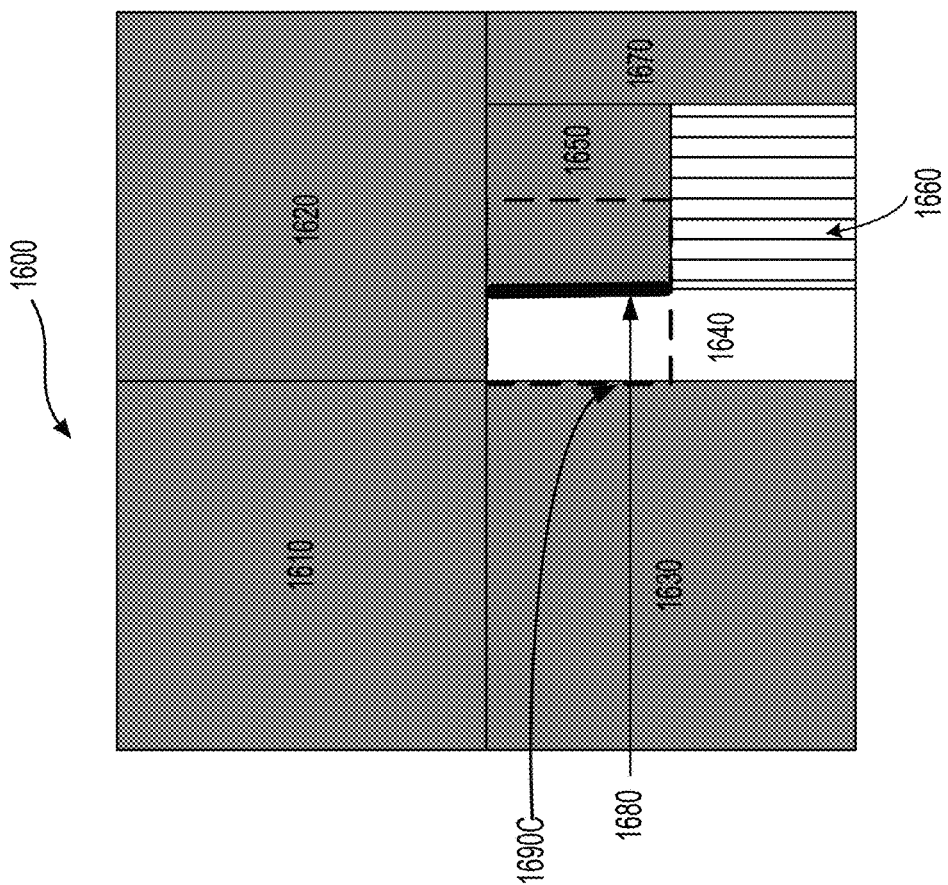
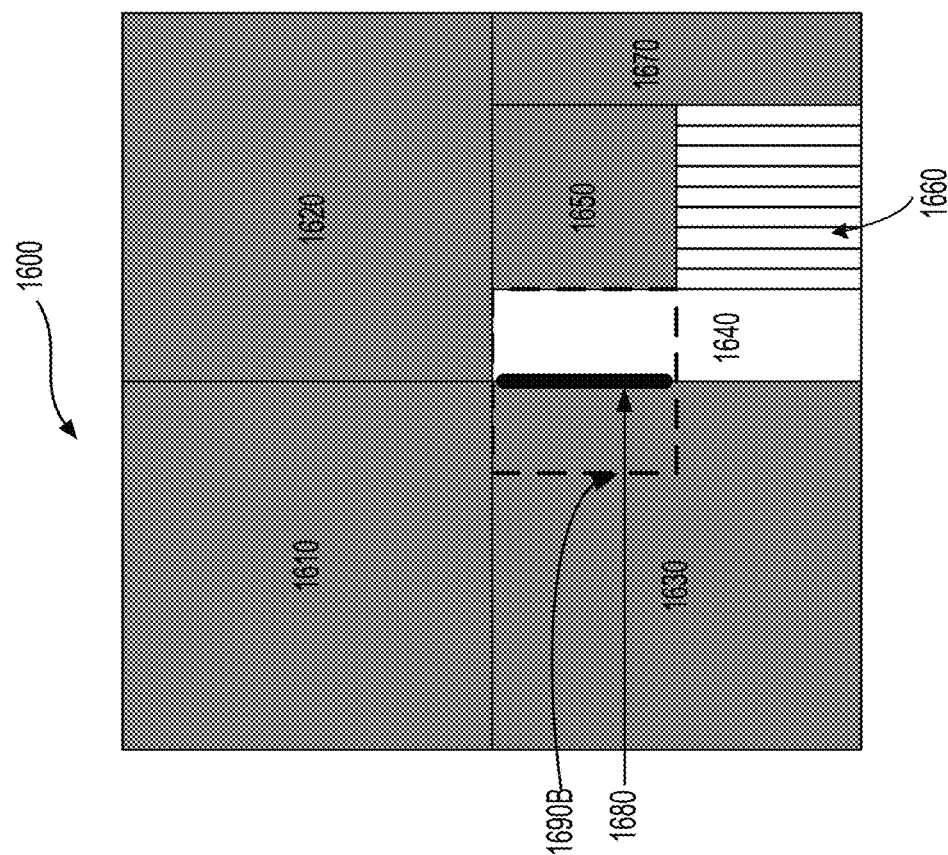

METHOD AND APPARATUS IN VIDEO CODING WITH FLEXIBLE CODING ORDER

INCORPORATION BY REFERENCE

This present application is a continuation of U.S. Ser. No. 16/844,058 filed on Apr. 9, 2020, which claims the benefit of priority to U.S. Provisional Application No. 62/834,335, "REFERENCE SEARCH RANGE AVAILABILITY FOR INTRA PICTURE BLOCK COMPENSATION WITH FLEXIBLE CODING ORDERS" filed on Apr. 15, 2019. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 3, a current block (301) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (302 through 306, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. For example, the processing circuitry decodes prediction information of a current block from a coded video bitstream. The prediction information is indicative of an intra block copy mode. The current block is one of a plurality of coding blocks in a coding tree block (CTB) with a right to left coding order being allowed within the CTB. Further, the processing circuitry determines a block vector that points to a reference block in a same picture as the current block and checks that two corner samples of the reference block of the reference block have been reconstructed. In addition, the processing circuitry checks that an additional sample of the reference block has been reconstructed. Then, the processing circuitry reconstructs at least a sample of the current block based on reconstructed samples of the reference block that are retrieved from the reference sample memory.

In some embodiments, the processing circuitry checks that an additional corner sample of the reference block has been reconstructed. In an example, the processing circuitry checks that a top left corner sample and a bottom right corner sample of the reference block have been reconstructed and then checks that a bottom left corner sample of the reference block has been reconstructed.

In some embodiments, the processing circuitry checks that a non-corner sample of the reference block has been reconstructed. In an embodiment, the processing circuitry checks that a sample located at about a vertical center of the reference block has been reconstructed. For example, the processing circuitry checks that a bottom center sample of the reference block has been reconstructed.

In some embodiments, the processing circuitry determines whether enable conditions are met and then checks, when the enable conditions are met, that the non-corner sample of the reference block has been reconstructed. In an example, the enable conditions include a first condition that the reference block is entirely on top of the current block and a second condition that a right edge of the reference block is on a right side of a left edge of the current block. In another example, the enable conditions include a first condition that the current block is a lower child from a horizontal binary tree split, and a second condition that a combination of the current block and an upper child from the horizontal binary split is a middle partition of a vertical ternary tree split.

In some embodiments, the processing circuitry checks that a sample located at a half block width left of a left edge of the current block has been reconstructed.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 11A-11D show examples of effective search ranges for the intra block copy mode according to an embodiment of the disclosure.

FIGS. 16A-16C show examples illustrating that additional checking locations are needed according to some embodiments of the disclosure.

DETAILED DESCRIPTION OF EMBODIMENTS

Figure 1:
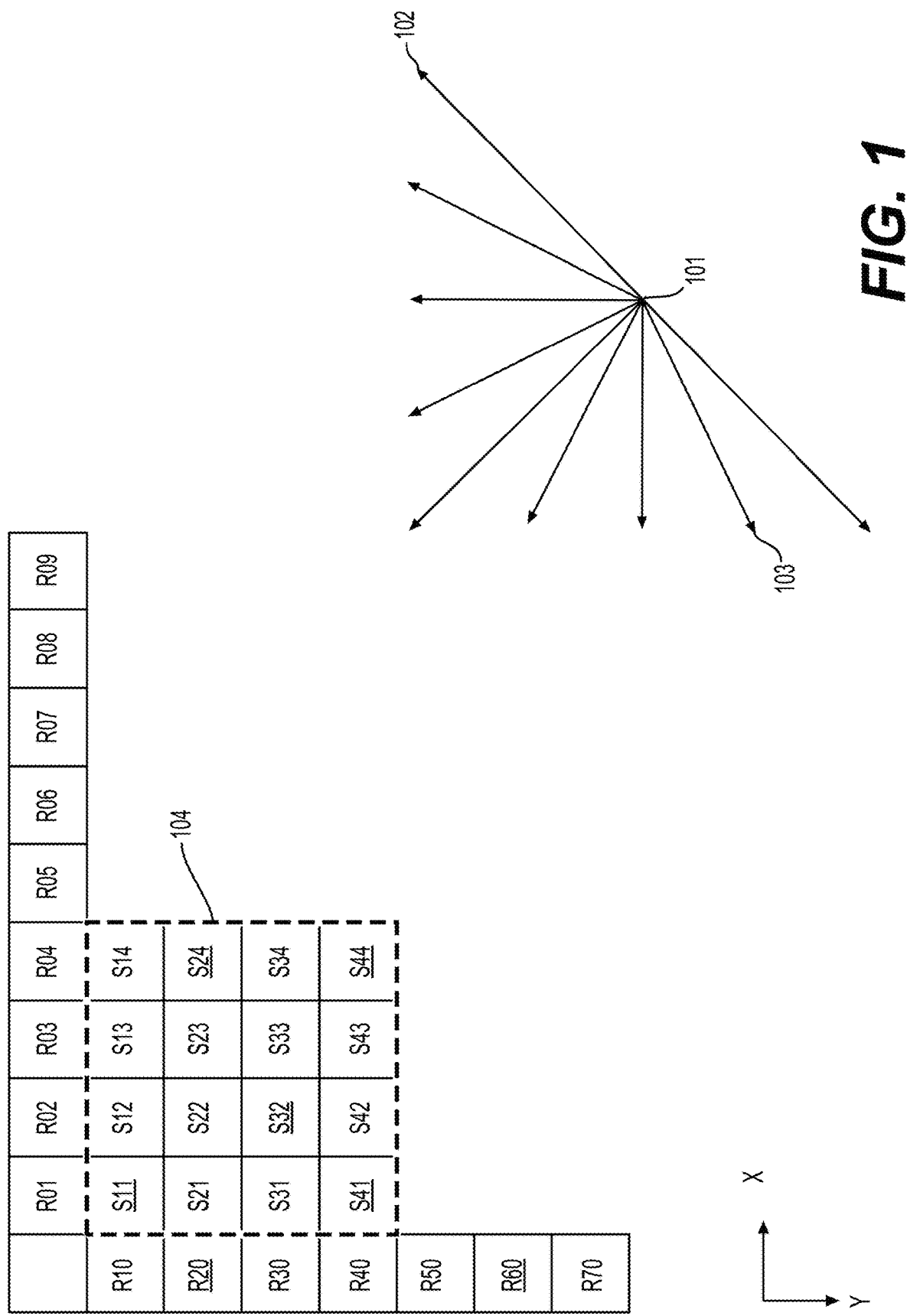
FIG. 1 is a schematic illustration of an exemplary subset of intra prediction modes.
Figure 2:
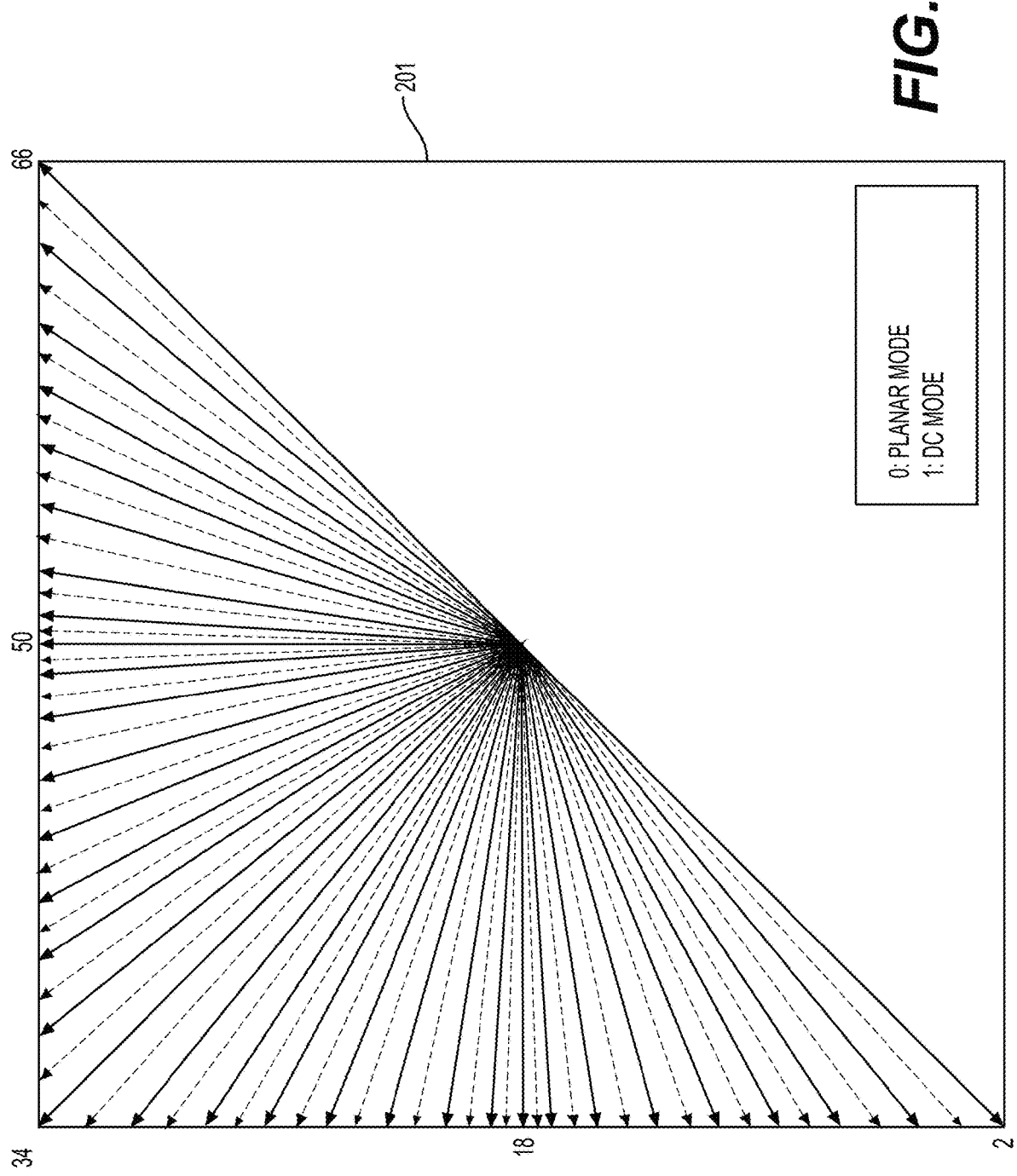
FIG. 2 is an illustration of exemplary intra prediction directions.
Figure 3:
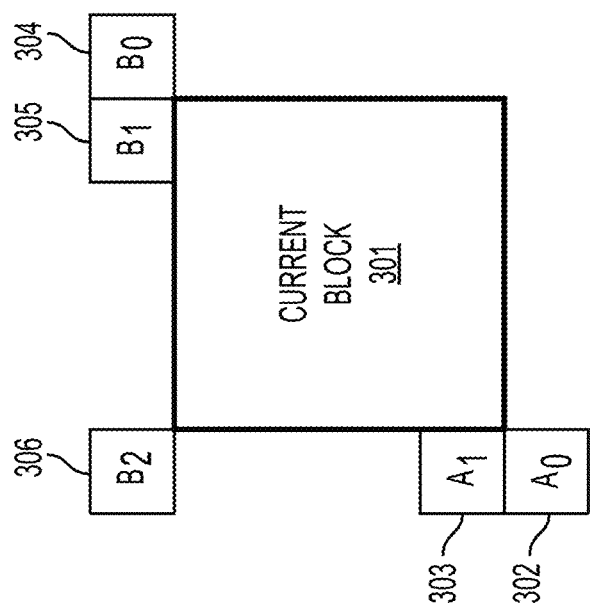
FIG. 3 is a schematic illustration of a current block and its surrounding spatial merge candidates in one example.
Figure 4:
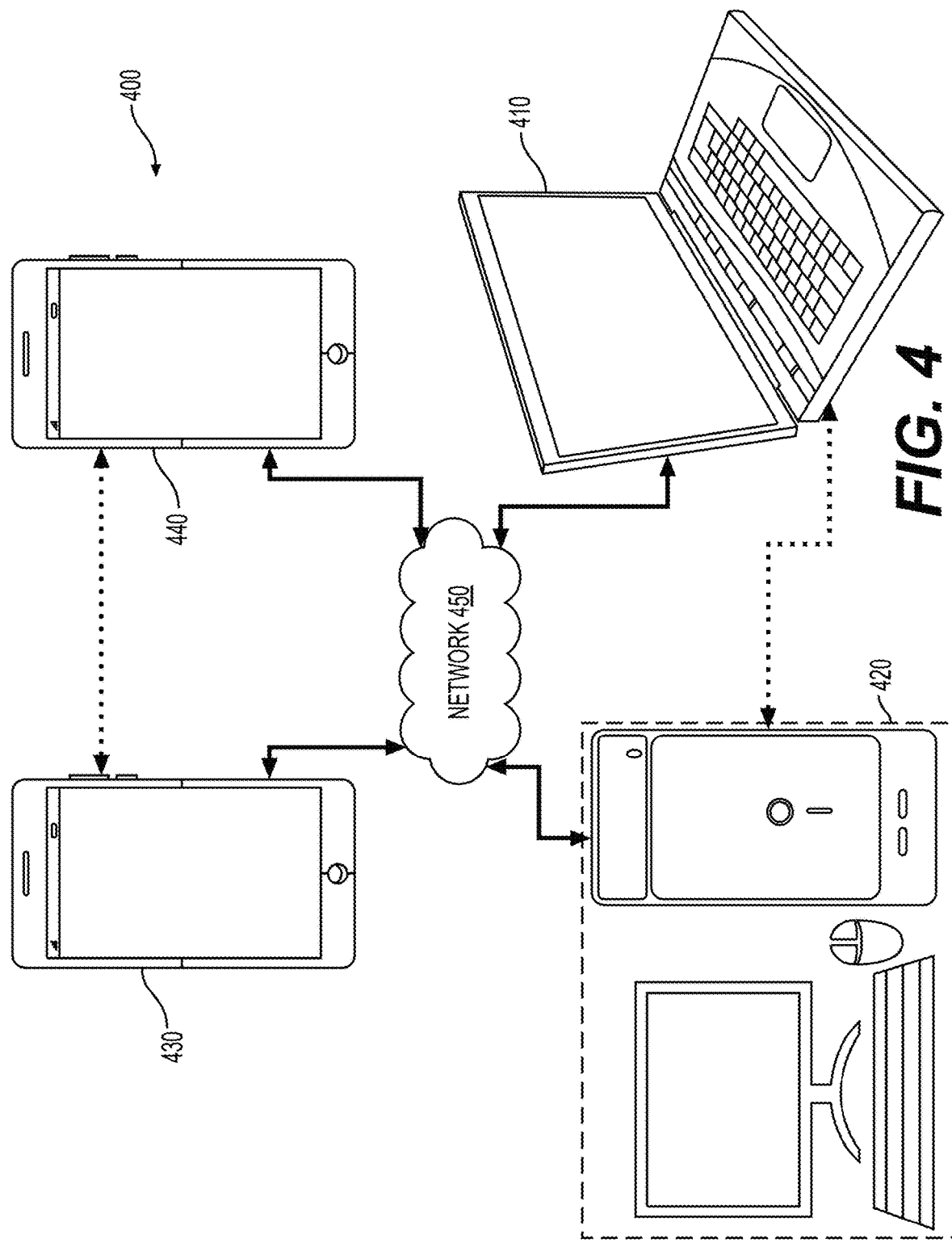
FIG. 4 is a schematic illustration of a simplified block diagram of a communication system (400) in accordance with an embodiment.

FIG. 4 illustrates a simplified block diagram of a communication system (400) according to an embodiment of the present disclosure. The communication system (400) includes a plurality of terminal devices that can communicate with each other, via, for example, a network (450). For example, the communication system (400) includes a first pair of terminal devices (410) and (420) interconnected via the network (450). In the FIG. 4 example, the first pair of terminal devices (410) and (420) performs unidirectional transmission of data. For example, the terminal device (410) may code video data (e.g., a stream of video pictures that are captured by the terminal device (410)) for transmission to the other terminal device (420) via the network (450). The encoded video data can be transmitted in the form of one or more coded video bitstreams. The terminal device (420) may receive the coded video data from the network (450), decode the coded video data to recover the video pictures and display video pictures according to the recovered video data. Unidirectional data transmission may be common in media serving applications and the like.

In another example, the communication system (400) includes a second pair of terminal devices (430) and (440) that performs bidirectional transmission of coded video data that may occur, for example, during videoconferencing. For bidirectional transmission of data, in an example, each terminal device of the terminal devices (430) and (440) may code video data (e.g., a stream of video pictures that are captured by the terminal device) for transmission to the other terminal device of the terminal devices (430) and (440) via the network (450). Each terminal device of the terminal devices (430) and (440) also may receive the coded video data transmitted by the other terminal device of the terminal devices (430) and (440), and may decode the coded video data to recover the video pictures and may display video pictures at an accessible display device according to the recovered video data.

In the FIG. 4 example, the terminal devices (410), (420), (430) and (440) may be illustrated as servers, personal computers and smart phones but the principles of the present disclosure may be not so limited. Embodiments of the present disclosure find application with laptop computers, tablet computers, media players and/or dedicated video conferencing equipment. The network (450) represents any number of networks that convey coded video data among the terminal devices (410), (420), (430) and (440), including for example wireline (wired) and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 5:
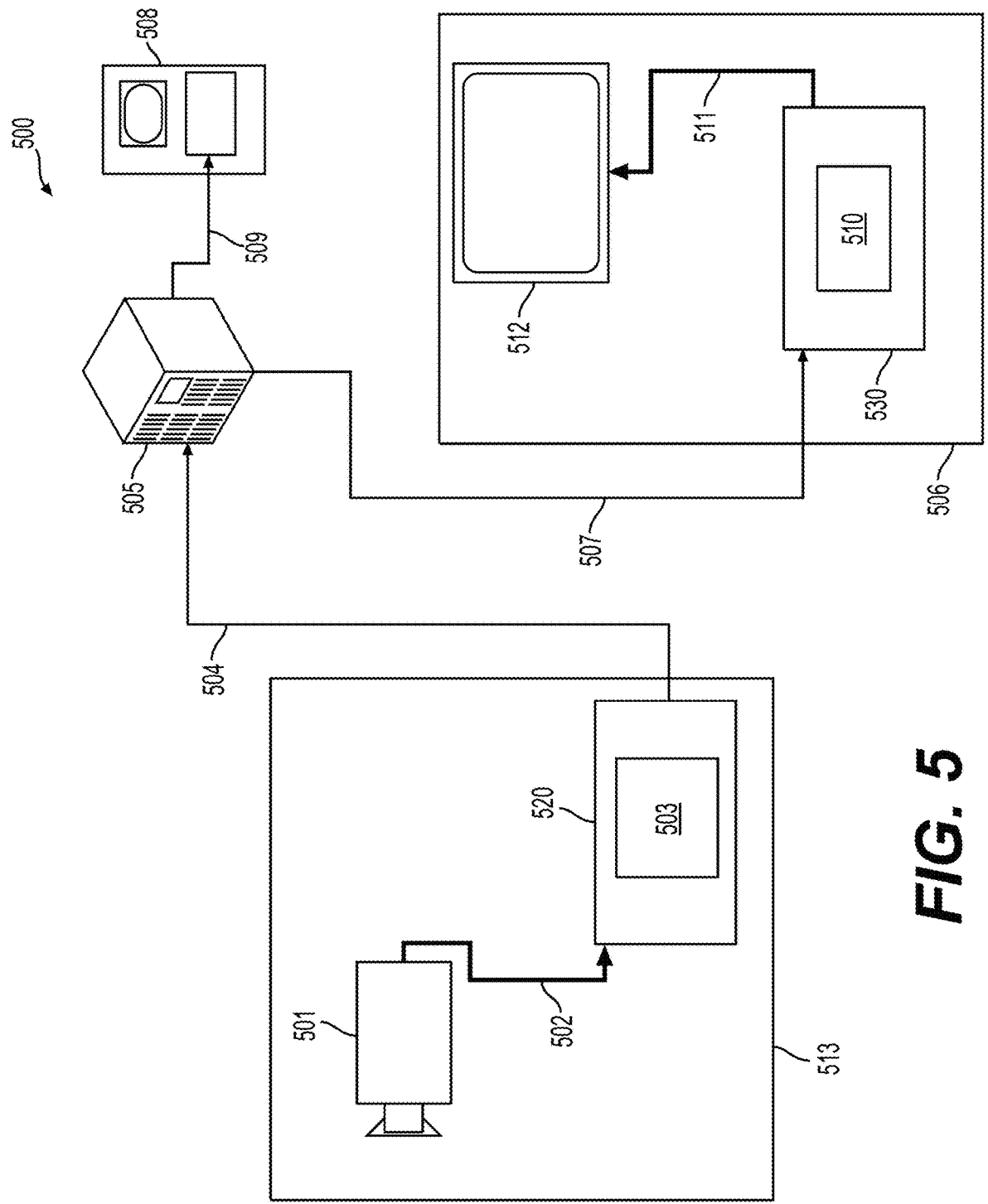
FIG. 5 is a schematic illustration of a simplified block diagram of a communication system (500) in accordance with an embodiment.

FIG. 5 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating for example a stream of video pictures (502) that are uncompressed. In an example, the stream of video pictures (502) includes samples that are taken by the digital camera. The stream of video pictures (502), depicted as a bold line to emphasize a high data volume when compared to encoded video data (504) (or coded video bitstreams), can be processed by an electronic device (520) that includes a video encoder (503) coupled to the video source (501). The video encoder (503) can include hardware, software, or a combination thereof to enable or implement aspects of the disclosed subject matter as described in more detail below. The encoded video data (504) (or encoded video bitstream (504)), depicted as a thin line to emphasize the lower data volume when compared to the stream of video pictures (502), can be stored on a streaming server (505) for future use. One or more streaming client subsystems, such as client subsystems (506) and (508) in FIG. 5 can access the streaming server (505) to retrieve copies (507) and (509) of the encoded video data (504). A client subsystem (506) can include a video decoder (510), for example, in an electronic device (530). The video decoder (510) decodes the incoming copy (507) of the encoded video data and creates an outgoing stream of video pictures (511) that can be rendered on a display (512) (e.g., display screen) or other rendering device (not depicted). In some streaming systems, the encoded video data (504), (507), and (509) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (520) and (530) can include other components (not shown). For example, the electronic device (520) can include a video decoder (not shown) and the electronic device (530) can include a video encoder (not shown) as well.

Figure 6:
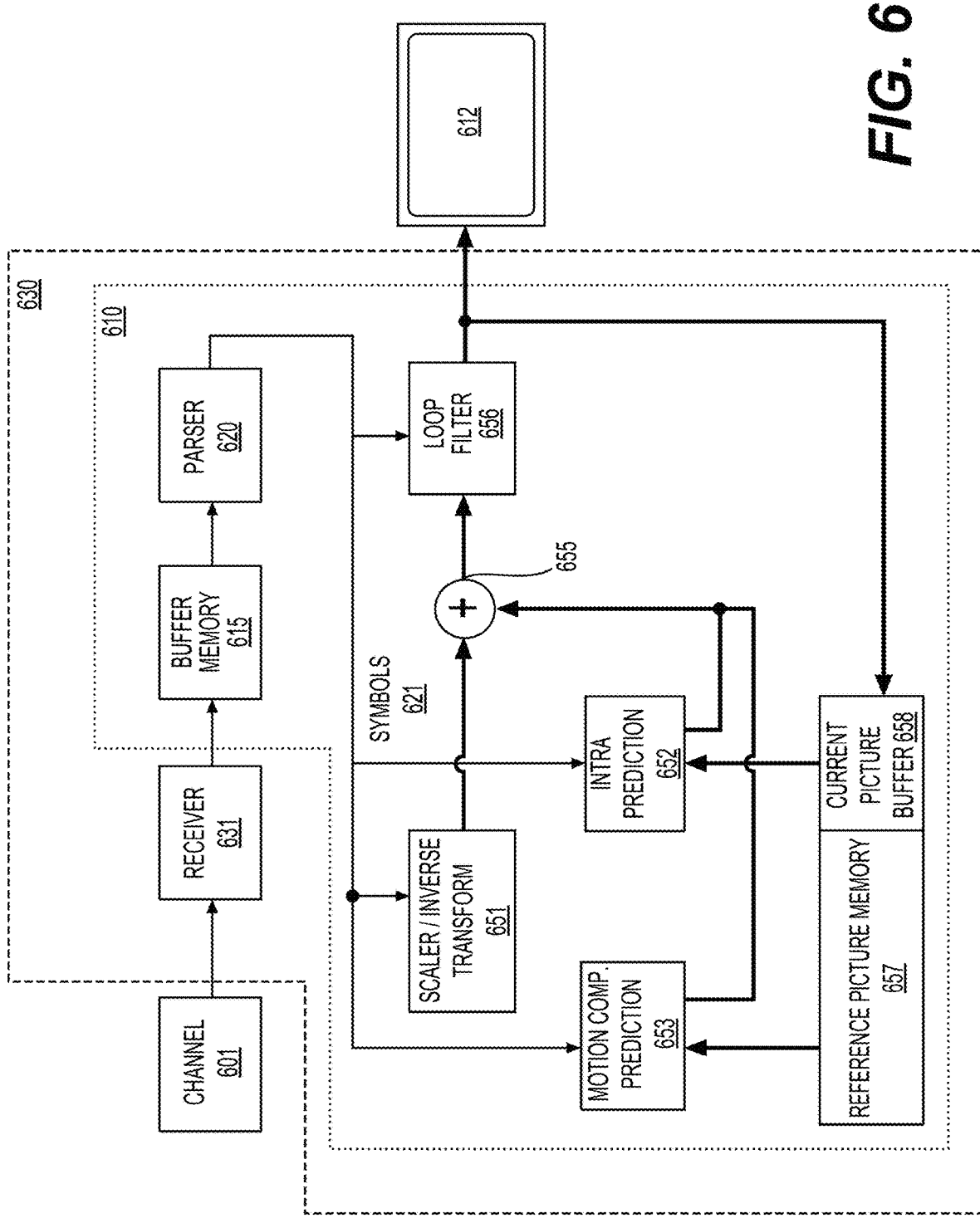
FIG. 6 is a schematic illustration of a simplified block diagram of a decoder in accordance with an embodiment.

FIG. 6 shows a block diagram of a video decoder (610) according to an embodiment of the present disclosure. The video decoder (610) can be included in an electronic device (630). The electronic device (630) can include a receiver (631) (e.g., receiving circuitry). The video decoder (610) can be used in the place of the video decoder (510) in the FIG. 5 example.

The receiver (631) may receive one or more coded video sequences to be decoded by the video decoder (610); in the same or another embodiment, one coded video sequence at a time, where the decoding of each coded video sequence is independent from other coded video sequences. The coded video sequence may be received from a channel (601), which may be a hardware/software link to a storage device which stores the encoded video data. The receiver (631) may receive the encoded video data with other data, for example, coded audio data and/or ancillary data streams, that may be forwarded to their respective using entities (not depicted). The receiver (631) may separate the coded video sequence from the other data. To combat network jitter, a buffer memory (615) may be coupled in between the receiver (631) and an entropy decoder/parser (620) ("parser (620)" henceforth). In certain applications, the buffer memory (615) is part of the video decoder (610). In others, it can be outside of the video decoder (610) (not depicted). In still others, there can be a buffer memory (not depicted) outside of the video decoder (610), for example to combat network jitter, and in addition another buffer memory (615) inside the video decoder (610), for example to handle playout timing. When the receiver (631) is receiving data from a store/forward device of sufficient bandwidth and controllability, or from an isosynchronous network, the buffer memory (615) may not be needed, or can be small. For use on best effort packet networks such as the Internet, the buffer memory (615) may be required, can be comparatively large and can be advantageously of adaptive size, and may at least partially be implemented in an operating system or similar elements (not depicted) outside of the video decoder (610).

The video decoder (610) may include the parser (620) to reconstruct symbols (621) from the coded video sequence. Categories of those symbols include information used to manage operation of the video decoder (610), and potentially information to control a rendering device such as a render device (612) (e.g., a display screen) that is not an integral part of the electronic device (630) but can be coupled to the electronic device (630), as was shown in FIG. 6. The control information for the rendering device(s) may be in the form of Supplemental Enhancement Information (SEI messages) or Video Usability Information (VUI) parameter set fragments (not depicted). The parser (620) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (620) may also extract from the coded video sequence information such as transform coefficients, quantizer parameter values, motion vectors, and so forth.

The parser (620) may perform an entropy decoding/ parsing operation on the video sequence received from the buffer memory (615), so as to create symbols (621).

Reconstruction of the symbols (621) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, the video decoder (610) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives a quantized transform coefficient as well as control information, including which transform to use, block size, quantization factor, quantization scaling matrices, etc. as symbol(s) (621) from the parser (620). The scaler/inverse transform unit (651) can output blocks comprising sample values, that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) generates a block of the same size and shape of the block under reconstruction, using surrounding already reconstructed information fetched from the current picture buffer (658). The current picture buffer (658) buffers, for example, partly reconstructed current picture and/or fully reconstructed current picture. The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a motion compensation prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (651) (in this case called the residual samples or residual signal) so as to generate output sample information. The addresses within the reference picture memory (657) from where the motion compensation prediction unit (653) fetches prediction samples can be controlled by motion vectors, available to the motion compensation prediction unit (653) in the form of symbols (621) that can have, for example X, Y, and reference picture components. Motion compensation also can include interpolation of sample values as fetched from the reference picture memory (657) when sub-sample exact motion vectors are in use, motion vector prediction mechanisms, and so forth.

The output samples of the aggregator (655) can be subject to various loop filtering techniques in the loop filter unit (656). Video compression technologies can include in-loop filter technologies that are controlled by parameters included in the coded video sequence (also referred to as coded video bitstream) and made available to the loop filter unit (656) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (656) can be a sample stream that can be output to the render device (612) as well as stored in the reference picture memory (657) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (620)), the current picture buffer (658) can become a part of the reference picture memory (657), and a fresh current picture buffer can be reallocated before commencing the reconstruction of the following coded picture.

The video decoder (610) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (631) may receive additional (redundant) data with the encoded video. The additional data may be included as part of the coded video sequence(s). The additional data may be used by the video decoder (610) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 7:
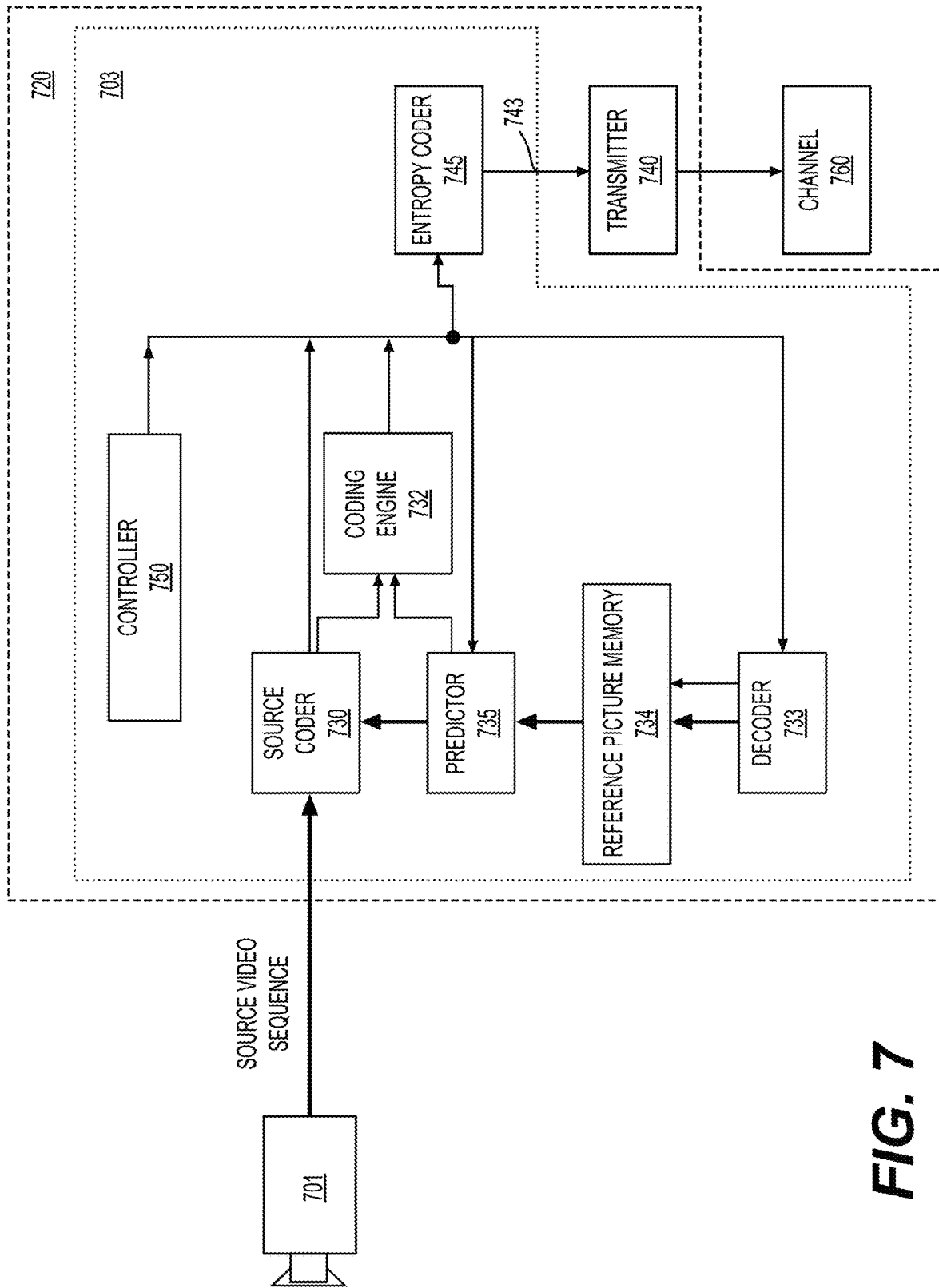
FIG. 7 is a schematic illustration of a simplified block diagram of an encoder in accordance with an embodiment.

FIG. 7 shows a block diagram of a video encoder (703) according to an embodiment of the present disclosure. The video encoder (703) is included in an electronic device (720). The electronic device (720) includes a transmitter (740) (e.g., transmitting circuitry). The video encoder (703) can be used in the place of the video encoder (503) in the FIG. 5 example.

The video encoder (703) may receive video samples from a video source (701) (that is not part of the electronic device (720) in the FIG. 7 example) that may capture video image(s) to be coded by the video encoder (703). In another example, the video source (701) is a part of the electronic device (720).

The video source (701) may provide the source video sequence to be coded by the video encoder (703) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (701) may be a storage device storing previously prepared video. In a videoconferencing system, the video source (701) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (703) may code and compress the pictures of the source video sequence into a coded video sequence (743) in real time or under any other time constraints as required by the application. Enforcing appropriate coding speed is one function of a controller (750). In some embodiments, the controller (750) controls other functional units as described below and is functionally coupled to the other functional units. The coupling is not depicted for clarity. Parameters set by the controller (750) can include rate control related parameters (picture skip, quantizer, lambda value of rate-distortion optimization techniques, . . . ), picture size, group of pictures (GOP) layout, maximum motion vector search range, and so forth. The controller (750) can be configured to have other suitable functions that pertain to the video encoder (703) optimized for a certain system design.

In some embodiments, the video encoder (703) is configured to operate in a coding loop. As an oversimplified description, in an example, the coding loop can include a source coder (730) (e.g., responsible for creating symbols, such as a symbol stream, based on an input picture to be coded, and a reference picture(s)), and a (local) decoder (733) embedded in the video encoder (703). The decoder (733) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (734). As the decoding of a symbol stream leads to bit-exact results independent of decoder location (local or remote), the content in the reference picture memory (734) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (733) can be the same as of a "remote" decoder, such as the video decoder (610), which has already been described in detail above in conjunction with FIG. 6. Briefly referring also to FIG. 6, however, as symbols are available and encoding/decoding of symbols to a coded video sequence by an entropy coder (745) and the parser (620) can be lossless, the entropy decoding parts of the video decoder (610), including the buffer memory (615), and parser (620) may not be fully implemented in the local decoder (733).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (730) may perform motion compensated predictive coding, which codes an input picture predictively with reference to one or more previously-coded picture from the video sequence that were designated as "reference pictures". In this manner, the coding engine (732) codes differences between pixel blocks of an input picture and pixel blocks of reference picture(s) that may be selected as prediction reference(s) to the input picture.

The local video decoder (733) may decode coded video data of pictures that may be designated as reference pictures, based on symbols created by the source coder (730). Operations of the coding engine (732) may advantageously be lossy processes. When the coded video data may be decoded at a video decoder (not shown in FIG. 7), the reconstructed video sequence typically may be a replica of the source video sequence with some errors. The local video decoder (733) replicates decoding processes that may be performed by the video decoder on reference pictures and may cause reconstructed reference pictures to be stored in the reference picture cache (734). In this manner, the video encoder (703) may store copies of reconstructed reference pictures locally that have common content as the reconstructed reference pictures that will be obtained by a far-end video decoder (absent transmission errors).

The predictor (735) may perform prediction searches for the coding engine (732). That is, for a new picture to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the source coder (730), including, for example, setting of parameters and subgroup parameters used for encoding the video data.

Output of all aforementioned functional units may be subjected to entropy coding in the entropy coder (745). The entropy coder (745) translates the symbols as generated by the various functional units into a coded video sequence, by lossless compressing the symbols according to technologies such as Huffman coding, variable length coding, arithmetic coding, and so forth.

The transmitter (740) may buffer the coded video sequence(s) as created by the entropy coder (745) to prepare for transmission via a communication channel (760), which may be a hardware/software link to a storage device which would store the encoded video data. The transmitter (740) may merge coded video data from the video coder (703) with other data to be transmitted, for example, coded audio data and/or ancillary data streams (sources not shown).

The controller (750) may manage operation of the video encoder (703). During coding, the controller (750) may assign to each coded picture a certain coded picture type, which may affect the coding techniques that may be applied to the respective picture. For example, pictures often may be assigned as one of the following picture types:

An intra picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (703) may perform coding operations according to a predetermined video coding technology or standard, such as ITU-T Rec. H.265. In its operation, the video encoder (703) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The source coder (730) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 8:
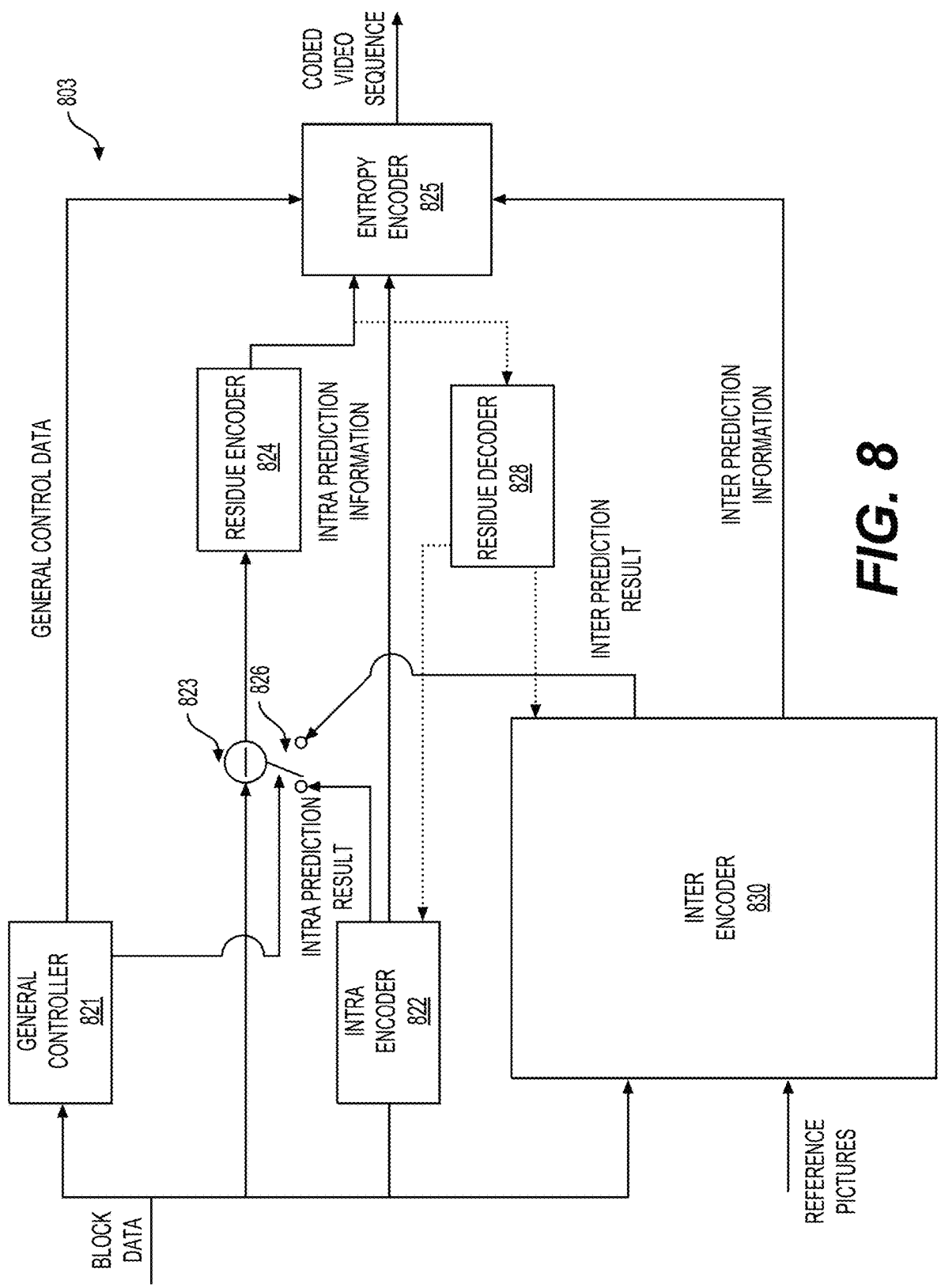
FIG. 8 shows a block diagram of an encoder in accordance with another embodiment.

FIG. 8 shows a diagram of a video encoder (803) according to another embodiment of the disclosure. The video encoder (803) is configured to receive a processing block (e.g., a prediction block) of sample values within a current video picture in a sequence of video pictures, and encode the processing block into a coded picture that is part of a coded video sequence. In an example, the video encoder (803) is used in the place of the video encoder (503) in the FIG. 5 example.

In an HEVC example, the video encoder (803) receives a matrix of sample values for a processing block, such as a prediction block of 8×8 samples, and the like. The video encoder (803) determines whether the processing block is best coded using intra mode, inter mode, or bi-prediction mode using, for example, rate-distortion optimization. When the processing block is to be coded in intra mode, the video encoder (803) may use an intra prediction technique to encode the processing block into the coded picture; and when the processing block is to be coded in inter mode or bi-prediction mode, the video encoder (803) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (803) includes other components, such as a mode decision module (not shown) to determine the mode of the processing blocks.

In the FIG. 8 example, the video encoder (803) includes the inter encoder (830), an intra encoder (822), a residue calculator (823), a switch (826), a residue encoder (824), a general controller (821), and an entropy encoder (825) coupled together as shown in FIG. 8.

The inter encoder (830) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (822) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (822) also calculates intra prediction results (e.g., predicted block) based on the intra prediction information and reference blocks in the same picture.

The general controller (821) is configured to determine general control data and control other components of the video encoder (803) based on the general control data. In an example, the general controller (821) determines the mode of the block, and provides a control signal to the switch (826) based on the mode. For example, when the mode is the intra mode, the general controller (821) controls the switch (826) to select the intra mode result for use by the residue calculator (823), and controls the entropy encoder (825) to select the intra prediction information and include the intra prediction information in the bitstream; and when the mode is the inter mode, the general controller (821) controls the switch (826) to select the inter prediction result for use by the residue calculator (823), and controls the entropy encoder (825) to select the inter prediction information and include the inter prediction information in the bitstream.

The residue calculator (823) is configured to calculate a difference (residue data) between the received block and prediction results selected from the intra encoder (822) or the inter encoder (830). The residue encoder (824) is configured to operate based on the residue data to encode the residue data to generate the transform coefficients. In an example, the residue encoder (824) is configured to convert the residue data from a spatial domain to a frequency domain, and generate the transform coefficients. The transform coefficients are then subject to quantization processing to obtain quantized transform coefficients. In various embodiments, the video encoder (803) also includes a residue decoder (828). The residue decoder (828) is configured to perform inverse-transform, and generate the decoded residue data. The decoded residue data can be suitably used by the intra encoder (822) and the inter encoder (830). For example, the inter encoder (830) can generate decoded blocks based on the decoded residue data and inter prediction information, and the intra encoder (822) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (825) is configured to format the bitstream to include the encoded block. The entropy encoder (825) is configured to include various information according to a suitable standard, such as the HEVC standard. In an example, the entropy encoder (825) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 9:
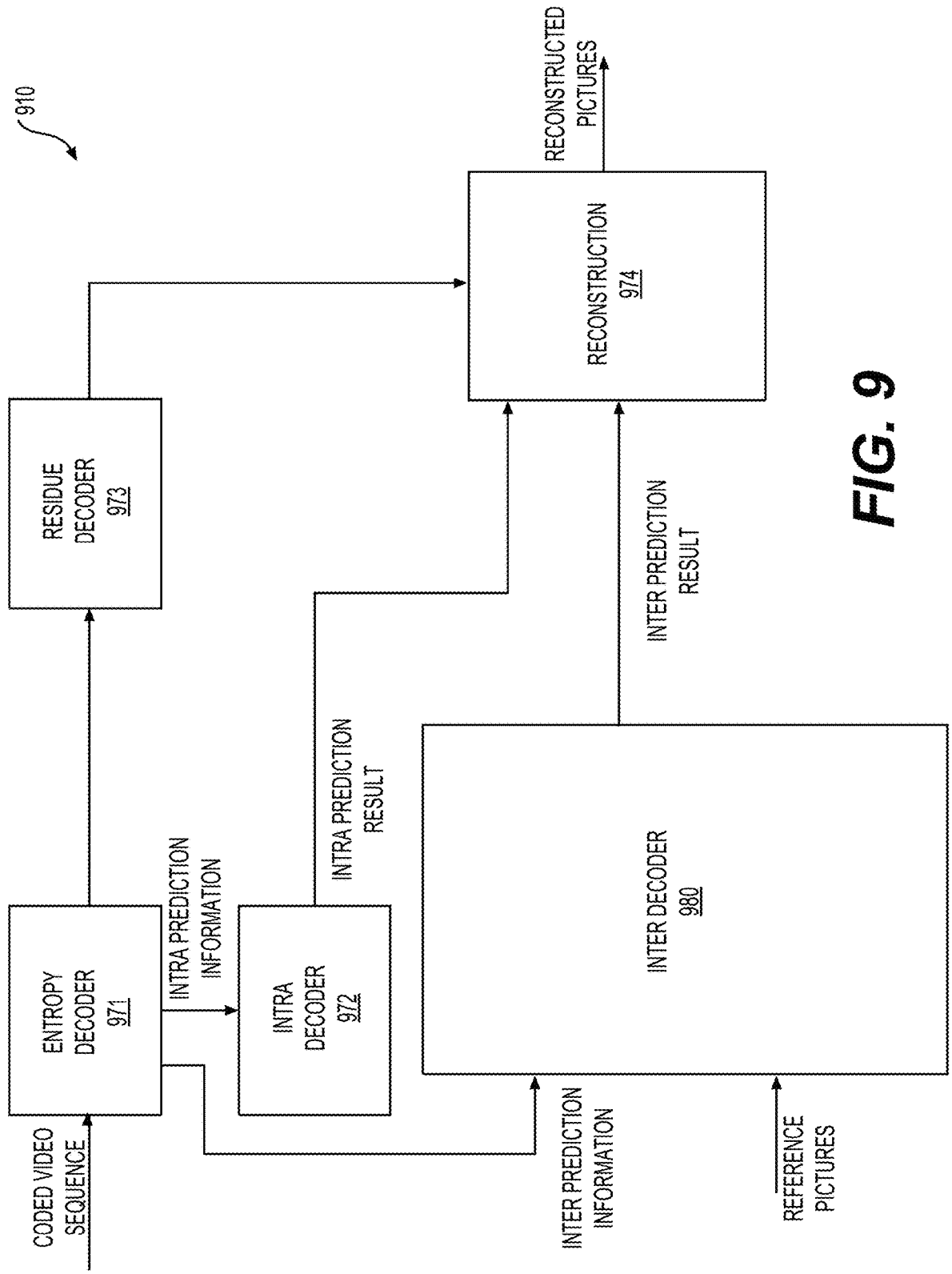
FIG. 9 shows a block diagram of a decoder in accordance with another embodiment.

FIG. 9 shows a diagram of a video decoder (910) according to another embodiment of the disclosure. The video decoder (910) is configured to receive coded pictures that are part of a coded video sequence, and decode the coded pictures to generate reconstructed pictures. In an example, the video decoder (910) is used in the place of the video decoder (510) in the FIG. 5 example.

In the FIG. 9 example, the video decoder (910) includes an entropy decoder (971), an inter decoder (980), a residue decoder (973), a reconstruction module (974), and an intra decoder (972) coupled together as shown in FIG. 9.

The entropy decoder (971) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (972) or the inter decoder (980), respectively, residual information in the form of, for example, quantized transform coefficients, and the like. In an example, when the prediction mode is inter or bi-predicted mode, the inter prediction information is provided to the inter decoder (980); and when the prediction type is the intra prediction type, the intra prediction information is provided to the intra decoder (972). The residual information can be subject to inverse quantization and is provided to the residue decoder (973).

The inter decoder (980) is configured to receive the inter prediction information, and generate inter prediction results based on the inter prediction information.

The intra decoder (972) is configured to receive the intra prediction information, and generate prediction results based on the intra prediction information.

The residue decoder (973) is configured to perform inverse quantization to extract de-quantized transform coefficients, and process the de-quantized transform coefficients to convert the residual from the frequency domain to the spatial domain. The residue decoder (973) may also require certain control information (to include the Quantizer Parameter (QP)), and that information may be provided by the entropy decoder (971) (data path not depicted as this may be low volume control information only).

The reconstruction module (974) is configured to combine, in the spatial domain, the residual as output by the residue decoder (973) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (503), (703), and (803), and the video decoders (510), (610), and (910) can be implemented using any suitable technique. In an embodiment, the video encoders (503), (703), and (803), and the video decoders (510), (610), and (910) can be implemented using one or more integrated circuits. In another embodiment, the video encoders (503), (703), and (703), and the video decoders (510), (610), and (910) can be implemented using one or more processors that execute software instructions.

Aspects of the disclosure provide encoding/decoding techniques for intra picture block compensation, especially techniques for determining reference search range availability for intra picture block compensation with flexible coding order.

Block based compensation can be used for inter prediction and intra prediction. For the inter prediction, block based compensation from a different picture is known as motion compensation. For intra prediction, block based compensation can also be done from a previously reconstructed area within the same picture. The block based compensation from reconstructed area within the same picture is referred to as intra picture block compensation, current picture referencing (CPR) or intra block copy (IBC). A displacement vector that indicates the offset between the current block and the reference block in the same picture is referred to as a block vector (or BV for short). Different from a motion vector in motion compensation, which can be at any value (positive or negative, at either x or y direction), a block vector has a few constraints to ensure that the reference block is available and already reconstructed. Also, in some examples, for parallel processing consideration, some reference area that is tile boundary or wavefront ladder shape boundary is excluded.

The coding of a block vector could be either explicit or implicit. In the explicit mode (or referred to as advanced motion vector prediction (AMVP) mode in inter coding), the difference between a block vector and its predictor is signaled; in the implicit mode, the block vector is recovered from a predictor (referred to as block vector predictor), in a similar way as a motion vector in merge mode. The resolution of a block vector, in some implementations, is restricted to integer positions; in other systems, the block vector is allowed to point to fractional positions.

In some examples, the use of intra block copy at block level, can be signaled using a block level flag that is referred to as an IBC flag. In an embodiment, the IBC flag is signaled when the current block is not coded in merge mode. In other examples, the use of the intra block copy at block level is signaled by a reference index approach. The current picture under decoding is then treated as a reference picture. In an example, such a reference picture is put in the last position of a list of reference pictures. This special reference picture is also managed together with other temporal reference pictures in a buffer, such as decoded picture buffer (DPB).

There are also some variations for intra block copy, such as flipped intra block copy (the reference block is flipped horizontally or vertically before used to predict current block), or line based intra block copy (each compensation unit inside an M×N coding block is an M×1 or 1×N line).

Figure 10:
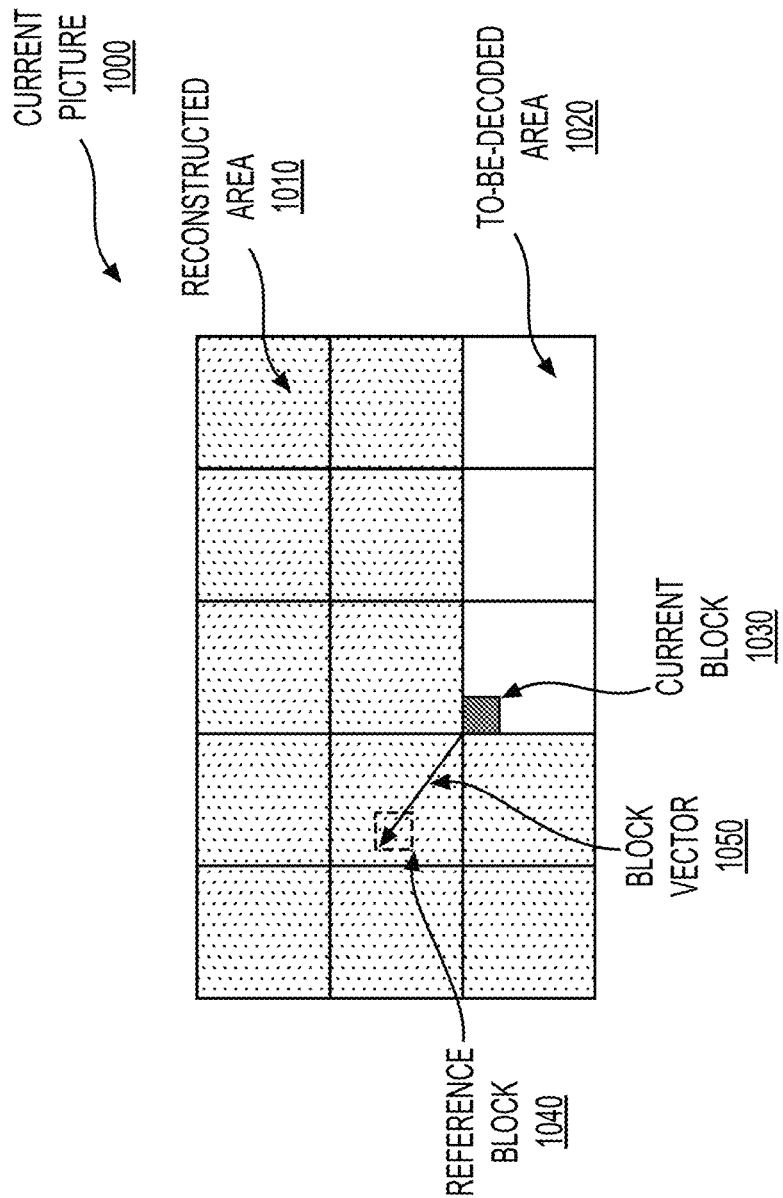
FIG. 10 shows an example of intra block copy according to an embodiment of the disclosure.

FIG. 10 shows an example of intra block copy according to an embodiment of the disclosure. Current picture (1000) is under decoding. The current picture (1000) includes a reconstructed area (1010) (doted area) and to-be-decoded area (1020) (white area). A current block (1030) is under reconstruction by a decoder. The current block (1030) can be reconstructed from a reference block (1040) that is in the reconstructed area (1010). The position offset between the reference block (1040) and the current block (1030) is referred to as a block vector (1050) (or BV (1050)).

In some examples (e.g., VVC), the search range of intra block copy mode is constrained to be within the current CTU. Then, the memory requirement to store reference samples for the intra block copy mode is 1 (largest) CTU size of samples. In an example, the (largest) CTU has a size of 128×128 samples. The CTU is divided into four block regions that each has a size of 64×64 samples, in some examples. Thus, in some embodiments, the total memory (e.g., cache memory with fast access speed than a main storage) is able to store samples for a size of 128×128, and the total memory includes an existing reference sample memory portion to store reconstructed samples in the current block, such as a 64×64 region, and additional memory portion to store samples of three other regions of the size 64×64. Thus, in some examples, the effective search range of the intra block copy mode is extended to some part of the left CTU while the total memory requirement for storing reference pixels are kept unchanged (e.g., 1 CTU size, 4 times of the 64×64 reference sample memory in total).

In some embodiments, an update process is performed to update the stored reference samples from the left CTU to the reconstructed samples from the current CTU. Specifically, in some examples, the update process is done on a 64×64 luma sample basis. In an embodiment, for each of the four 64×64 block regions in the CTU size memory, the reference samples in the regions from the left CTU can be used to predict the coding block in current CTU with CPR mode until any of the blocks in the same region of the current CTU is being coded or has been coded.

FIGS. 11A-11D show examples of effective search ranges for the intra block copy mode according to an embodiment of the disclosure. In some examples, an encoder/decoder includes a cache memory that is able to store samples of one CTU, such as 128×128 samples, and can be referred to as reference sample memory. In some embodiments, the reference sample memory is updated based on units of block regions. A CTU can include a plurality of block regions. Before a reconstruction of a block region, a memory space in the reference sample memory is allocated and reset to store the reconstructed samples of the block region. In the FIGS. 11A-11D examples, a block region for prediction has a size of 64×64 samples. It is noted that the examples can be suitably modified for block region of other suitable sizes.

Each of FIGS. 11A-11D shows a current CTU (1120) and a CTU to the immediate left of the current CTU (hereinafter "left CTU") (1110). The left CTU (1110) includes four block regions (1111)-(1114), and each block region has a sample size of 64×64 samples. The current CTU (1120) includes four block regions (1121)-(1124), and each block region has a sample size of 64×64 samples. The current CTU (1120) is the CTU that includes a current block region (as shown with vertical stripe pattern) under reconstruction. The left CTU (1110) is the immediate neighbor on the left side of the current CTU (1120). It is noted in FIGS. 11A-11D, the grey blocks are block regions that are already reconstructed, and the white blocks are block regions that are to be reconstructed.

In FIG. 11A, the current block region under reconstruction is the block region (1121). The cache memory stores reconstructed samples in the block regions (1112), (1113) and (1114), and the cache memory will be used to store reconstructed samples of the current block region (1121). In the FIG. 11A example, the effective search range for the current block region (1121) includes the block regions (1112), (1113) and (1114) in the left CTU (1110) with reconstructed samples stored in the cache memory. It is noted that, in an embodiment, the reconstructed samples of the block region (1111) are stored in a main memory (e.g., are copied from the cache memory to the main memory before the reconstruction of the block region (1121)) that has a slower access speed than the cache memory.

In FIG. 11B, the current block region under reconstruction is the block region (1122). The cache memory stores reconstructed samples in the block regions (1113), (1114) and (1121), and the cache memory will be used to store reconstructed samples of the current block region (1122). In the FIG. 11B example, the effective search range for the current block region (1122) includes the block regions (1113) and (1114) in the left CTU (1110) and block region (1121) in the current CTU (1020) with reconstructed samples stored in the cache memory. It is noted that, in an embodiment, the reconstructed samples of the block region (1112) are stored in a main memory (e.g., are copied from the cache memory to the main memory before the reconstruction of the block region (1122)) that has a slower access speed than the cache memory.

In FIG. 11C, the current block region under reconstruction is the block region (1123). The cache memory stores reconstructed samples in the block regions (1114), (1121) and (1122), and the cache memory will be used to store reconstructed samples of the current block region (1123). In the FIG. 11C example, the effective search range for the current block (1123) includes the block region (1114) in the left CTU (1110) and block regions (1121) and (1122) in the current CTU (1120) with reconstructed samples stored in the cache memory. It is noted that, in an embodiment, the reconstructed samples of the block region (1113) are stored in a main memory (e.g., are copied from the cache memory to the main memory before the reconstruction of the block region (1023)) that has a slower access speed than the cache memory.

In FIG. 11D, the current block region under reconstruction is the block region (1124). The cache memory stores reconstructed samples in the block regions (1121), (1122) and (1123), and the cache memory will be used to store reconstructed samples of the current block region (1124). In the FIG. 11D example, the effective search range for the current block region (1124) includes the blocks (1121), (1122) and (1123) in the current CTU (1120) with reconstructed samples stored in the cache memory. It is noted that, in an embodiment, the reconstructed samples of the block region (1114) are stored in a main memory (e.g., are copied from the cache memory to the main memory before the reconstruction of the block region (1124)) that has a slower access speed than the cache memory.

In some embodiments, the designated memory to store reference samples of previously coded CUs for future intra block copy reference is referred as reference sample memory. In an example, such as VVC standard, one CTU size of reference samples is considered as the designated memory size. In some examples, the cache memory has a total memory space for 1 (largest) CTU size. The examples can be suitably adjusted for other suitable CTU sizes. It is noted that the cache memory that is designated to store reference samples of previously coded CUs for future intra block copy reference is referred to as reference sample memory in some examples.

According to an aspect of the disclosure, collocated blocks in the present disclosure refer to a pair of blocks that have the same sizes, one of the collocated blocks is in the previously coded CTU, the other of the collocated blocks is in the current CTU, and one block in the pair is referred to as a collated block of the other block in the pair. Further, when the memory buffer size is designed to store a CTU of the maximum size (e.g., 128×128), then the previous CTU refers to the CTU that has one CTU width luma sample offset to the left of current CTU in an example. In addition, these two collocated blocks have the same location offset values relative to the top left corner of their own CTU, respectively. Or in other words, collocated blocks are those two that have the same y coordinate relative to the top left corner of a picture, but with a CTU width difference in x coordinates to one another in some examples.

Figure 12:
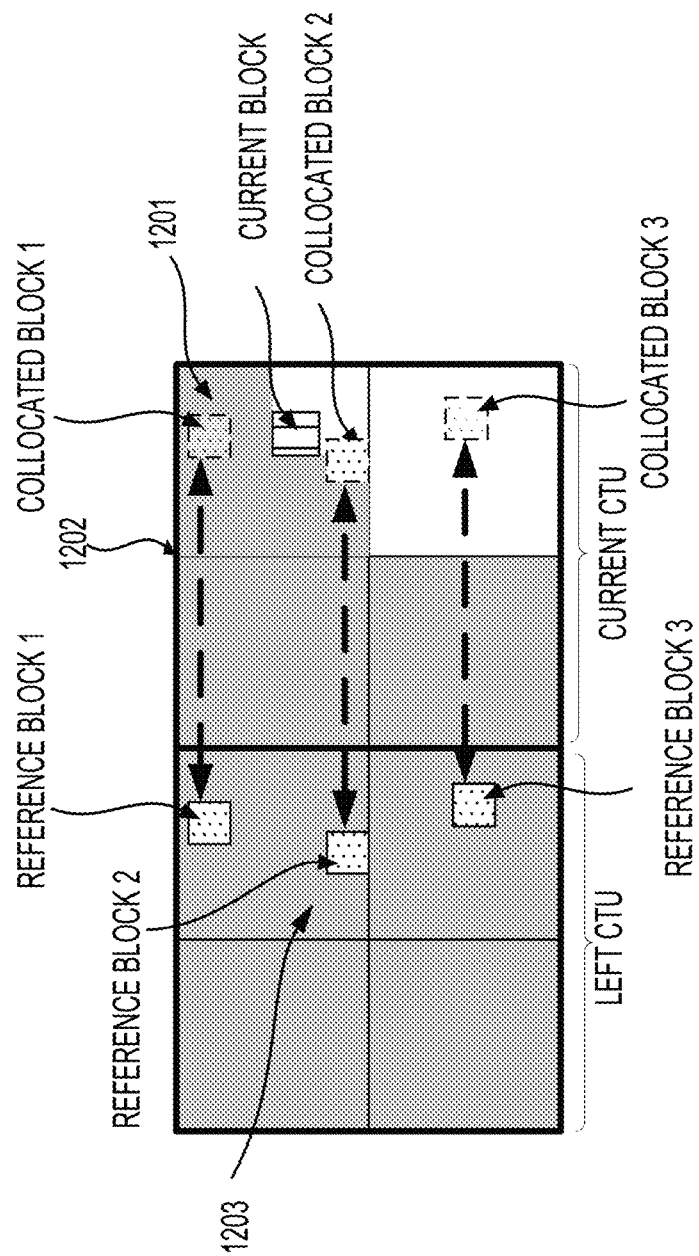
FIG. 12 shows examples of collocated blocks according to some embodiments of the disclosure.

FIG. 12 shows examples of collocated blocks according to some embodiments of the disclosure. In the FIG. 12 example, a current CTU and a left CTU during decoding are shown. The area that has been reconstructed is shown in grey color, and the area to be reconstructed is shown in white color. FIG. 12 shows three examples of reference blocks in the left CTU for the current block in the intra block copy mode during decoding. The three examples are shown as reference block 1, reference block 2 and reference block 3. FIG. 12 also shows the collocated block 1 for the reference block 1, collocated block 2 for the reference block 2 and collocated block 3 for the reference block 3. In the FIG. 12 example, the reference sample memory size is a CTU size. Reconstructed samples of the current CTU and the left CTU are stored in the reference sample memory in a complementary manner. When a reconstructed sample of the current CTU is written to the reference sample memory, the reconstructed sample is written in the place of a collocated sample in the left CTU. In an example, for the reference block 3, because the collocated block 3 in the current CTU has not yet been reconstructed, thus the reference block 3 can be found from the reference sample memory. The reference sample memory still stores samples of the reference block 3 from the left CTU and can be accessed with fast speed to retrieve the samples of the reference block 3, and the reference block 3 can be used to reconstruct the current block in the intra block copy mode in an example.

In another example, for the reference block 1, the collocated block 1 in the current CTU has been reconstructed completed, thus the reference sample memory stores samples of the collocated block 1, and the samples of the reference block 1 have been stored in, for example, an off-chip storage that has relative high delay compared to the reference sample memory. Thus, in an example, the reference block 1 cannot be found in the reference sample memory, and the reference block 1 cannot be used to reconstruct the current block in the intra block copy mode in an example.

Similarly, in another example, for the reference block 2, even if the collocated block 2 in the current CTU has not yet been reconstructed, because the 64×64 block region that includes the collocated blocks 2 is considered as a whole in a memory update example, then the reference block 2 is not a valid reference block for reconstructing the current block in the intra block copy mode.

Generally, in the intra block copy mode, for a reference block in the previously decoded CTU, when the collocated block in the current CTU has not yet been reconstructed, then samples of the reference block are available in the reference sample memory, and the reference sample memory can be accessed to retrieve the samples of the reference block to use as reference for reconstruction in the intra block copy mode.

It is noted that, in the above examples, the top left corner sample of the collocated block in the current CTU, which is also referred to as the collocated sample of the top left corner of the reference block, is checked. When the collocated sample in the current CTU has not yet been reconstructed, the rest of samples for the reference block will all be available for use as reference in the intra block copy.

In some embodiments, a CTU may be divided into block regions to determine valid reference block regions. For example, a CTU of 128×128 is divided into four 64×64 block regions. In an example, for the reference block 2, even if the collocated block 2 in the current CTU has not yet been reconstructed, the reference block 2 may not become a valid reference block if the entire 64×64 block region (1201) of the collocated block 2 is considered as a whole. For example, by checking the top left corner (1202) of the 64×64 block region (1201) (top-right 64×64 region of current CTU) where the collocated block 2 belongs to, that top left corner (1202) is considered being reconstructed therefore the entire of the 64×64 block region (1203) where reference block 2 belongs to cannot be used as reference block region.

When reference sample memory size is larger than the CTU size, more than 1 CTU to the left may be used to store reference samples for intra block copy. For example, when the CTU size is 64×64 while the reference memory size is 128×128, in addition to current CTU, 3 left CTUs may be considered as the valid reference area for intra block copy.

It is also noted that, in the above examples, the memory size of the reference sample memory is the size of one CTU, then the previously decoded CTU means the CTU immediate to the left of current CTU.

According to an aspect of the disclosure, the memory size of the reference sample memory can be larger than the size of one CTU.

According to some aspects of the disclosure, for a valid search range, the bitstream conformance requires the luma block vector mvL to obey the certain constraints. In an example, a current CTB is a luma CTB including a plurality of luma samples and a block vector mvL satisfies the following constraints for bitstream conformance.

In some examples, first constraints are used to make sure that the reference block for the current block has to be reconstructed. When the reference block has a rectangular shape, a reference block availability checking process can be implemented to check whether a top left sample and a bottom right sample of the reference block are reconstructed. When both the top left sample and the bottom right sample of the reference block are reconstructed, the reference block is determined to have been reconstructed.

For example, a reconstructed top left sample of the reference block should be available. In some examples, a derivation process for block availability can be invoked, the derivation process can receive a current luma location and a neighboring luma position as inputs, and generate an output that indicates whether a sample at the neighboring luma position has been reconstructed. For example, when the output is TRUE, the sample at the input position has been reconstructed; and when the output is FALSE, the sample at the input position hasn't been reconstructed yet.

Generally, the current luma position is set to (xCb, yCb), which is the position of the top left sample of the current block. Further, mvL denotes block vector, mvL[0] denotes the x component and mvL[1] denotes the y component of the block vector. In some examples, the x component and y component are stored in 1/16 inter sample accuracy, thus the x component and the y component can have 4-bit for fractional parts of a pixel. Then, to get the inter part, the x component and y component can be right shift by 4. The current luma location (xCurr, yCurr) is set to be the top left sample of the current block (xCb, yCb), the neighboring luma location can be represented by (xCb+(mvL[0]>>4), yCb+(mvL[1]>>4)) which is the position of the top left sample of the reference block. In an example, a derivation process for reference block availability is invoked, the positon of the top left sample of the reference block is used as an input, when an output is equal to TRUE, the top left sample of the reference block is reconstructed. The availability check of the top left sample of the reference block is referred to as check-A.

Similarly, the reconstructed bottom right sample of the reference block should be available. In some examples, a derivation process for block availability can be invoked, and the input to the derivation process includes the position of the bottom right sample of the reference block. For example, the current luma positon is set to be (xCb, yCb), and width of the current block and the reference block is denoted by cbWidth, the height of the current block and the reference block is denoted by cbHeight. Then, the position of the bottom right sample of the reference block is (xCb+(mvL[0]>>4)+cbWidth−1, yCb+(mvL[1]>>4)+cbHeight−1). The position of the bottom right sample is input to the derivation process for block availability, when the output is TRUE, the bottom right sample of the reference block is reconstructed. The availability check of the bottom right sample is referred to as check-B.

In some examples, second constraints ensure that the reference block is to the left and/or above of the current block and does not overlap with the current block. The second constraints can also include at least one of the following two conditions: 1) a value of (mvL[0] >>4)+cbWidth is less than or equal to 0, which indicates that the reference block is to the left of the current block and does not overlap with the current block; 2) a value of (mvL[1]>>4)+cbHeight is less than or equal to 0, which indicates that the reference block is above the current block and does not overlap with the current block. In an example, a check is performed according to the second constraints, and is referred to as check-C.

The third constraints ensure the reference block is in an appropriate search range. In some examples, the third constrains can include that the following conditions are satisfied by the block vector mvL:

$$(yCb+(mvL[1]>>4))>>Ctb\,Log\,2SizeY=yCb>>Ctb\,Log\,2SizeY \quad (Eq.\ 1)$$

$$(yCb+(mvL[1]>>4+cbHeight-1)>>Ctb\,Log\,2SizeY=yCb>>Ctb\,Log\,2SizeY \quad (Eq.\ 2)$$

$$(xCb+(mvL[0]>>4))>>Ctb\,Log\,2SizeY>=(xCb>>Ctb\,Log\,2SizeY)-(1<<((7-Ctb\,Log\,2SizeY)<<1)))+Min(1,7-Ctb\,Log\,2SizeY) \quad (Eq.\ 3)$$

$$(xCb+(mvL[0]>>4)+cbWidth-1)>>Ctb\,Log\,2SizeY<=(xCb>>Ctb\,Log\,2SizeY) \quad (Eq.\ 4)$$

where the parameters CtbLog2SizeY denotes the CTB size (e.g., height or width) in log 2 form. For example, when the CTB height is 128 samples, CtbLog2SizeY is 7. (Eq. 1) and (Eq. 2) specify that a CTB including the reference block is in a same CTB row as the current CTB (i.e., the previously reconstructed CTB is in a same row as the current CTB when the reference block is in the previously reconstructed CTB). (Eq. 3) and (Eq. 4) specify that the CTB including the reference block is either in a left CTB column of the current CTB or a same CTB column as the current CTB. The conditions as described by (Eq. 1)-(Eq. 4) specify that the CTB including the reference block is either the current CTB, or a left neighbor, such as the previously reconstructed CTB, of the current CTB.

In an example, a check that is performed according to (Eq. 1) is referred to as check-D; a check that is performed according to (Eq. 2) is referred to as check-E; a check that is performed according to (Eq. 3) is referred to as check-F; a check that is performed according to (Eq. 2) is referred to as check-G.

The fourth constraints ensure the reference block is stored in the reference sample memory, in other words, the collocated block of the reference block has not been reconstructed. In some examples, the fourth constraints can include following conditions: when the reference block is in the left neighbor of the current CTB, a collocated region for the reference block is not reconstructed (i.e., no samples in the collocated region have been reconstructed). Further, the collocated region for the reference block is in the current CTB.

In an example, the above conditions can be specified as below: when $(xCb+(mvL[0]>>4))>>CtbLog2SizeY$ is equal to $(xCb>>CtbLog2SizeY)-1$, and $CtbLog2SizeY$ is 7, the derivation process for reference block availability is invoked. The input for the current luma location (xCurr, yCurr) is set to be (xCb, yCb) and the input for the neighboring luma location is $(((xCb+(mvL[0]>>4)+CtbSizeY)>>(CtbLog2SizeY-1))<<(CtbLog2SizeY-1)$, $((yCb+(mvL[1]>>4))>>(CtbLog2SizeY-1))<<(CtbLog2SizeY-1))$. When an output of the derivation process is FALSE, the collocated region has not been reconstructed. In an example, the check of the collocated region is referred to as check-H.

Also, the luma location $(((xCb+(mvL[0]>>4)+CtbSizeY)>>(CtbLog2SizeY-1))<<(CtbLog2SizeY-1)$, $((yCb+(mvL[1]>>4))>>(CtbLog2SizeY-1))<<(CtbLog2SizeY-1))$ shall not be equal to (xCb, yCb). In an example, the inequality check is referred to as check-I.

According to some aspects of the disclosure, flexible coding order can be used in some coding techniques. In some embodiments, a CTU is recursively partitioned by quad-tree structure, binary tree structure or triple tree structure. The units in the partitioning process, which are further split into two, three, or four units are named split units (SUs). Usually the coding order of a split unit is from left to right and from above to bottom because of z scanning order of quad tree structure and raster scan of CTUs in a picture. However, normal left to right coding order is more beneficial to left inclined features than right inclined features. Not limited to intra prediction, even in inter prediction blocks with right inclined features cannot find similar motion information from left and above neighborhood.

In some examples, a technique that is referenced to as split unit coding order (SUCO) can be used. SUCO enables more flexible coding order, such as left to right (L2R) and right to left (R2L), to allow intra prediction from right reference pixels and inter prediction with right motion vector predictors. In some examples, if a split unit (SU) is partitioned vertically, a flag is signaled to indicate L2R or R2L coding order. Further, if a SU is partitioned by quad tree structure, a flag is shared for above two units and bottom two units. If no flag is signaled for the coding order of a SU, the following coding orders of that SU implicitly inherit from previous level SU.

Figure 13:
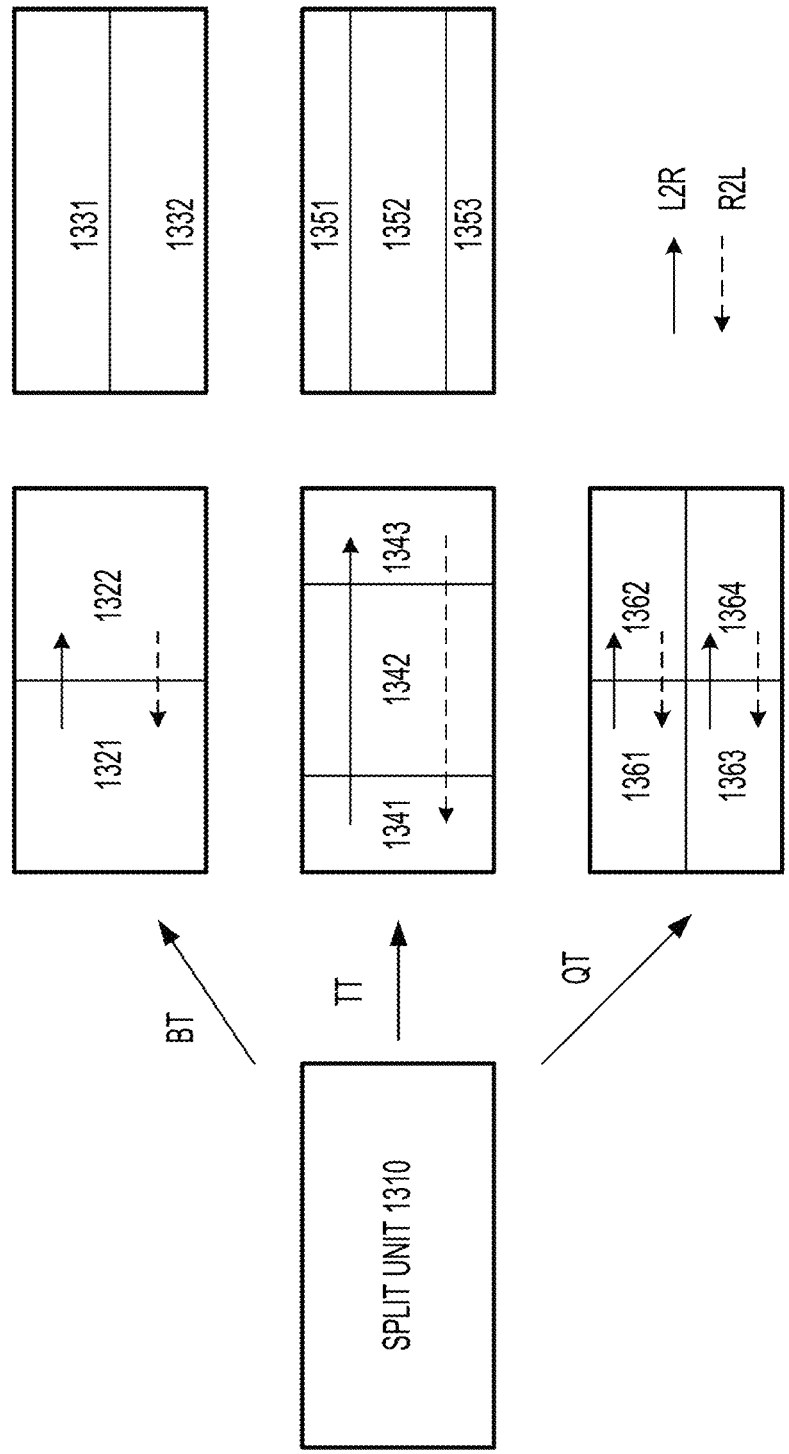
FIG. 13 shows examples for splits and coding orders.

FIG. 13 shows examples for splits and coding orders. For example, a split unit 1310 can be partitioned according to binary tree (BT) structure, triple tree (TT) structure, and quad-tree (QT) structure, and can be suitable coded in a left to right (L2R) order or a right to left (R2L) order.

For example, the split unit 1310 is vertically partitioned into units 1321 and 1322 according to BT structure. The units 1321 and 1322 can be coded in an L2R order or an R2L order. The split unit 1310 is horizontally partitioned into units 1331 and 1332 according to BT structure. The units 1331 and 1332 are coded generally in an above to bottom order.

In another example, the split unit 1310 is vertically partitioned into units 1341-1343 according to TT structure. The units 1341-1343 can be coded in an L2R order or an R2L order. The split unit 1310 is horizontally partitioned into units 1351-1352. The units 1351-1353 are coded generally in an above to bottom order.

In another example, the split unit 1310 is partitioned into units 1361-1364 according to QT structure. For L2R order, the units 1361-1364 can be coded following 1361, 1362, 1363 and 1364. For R2L order, the units 1361-1364 can be coded following 1362, 1361, 1364 and 1363.

Figure 14:
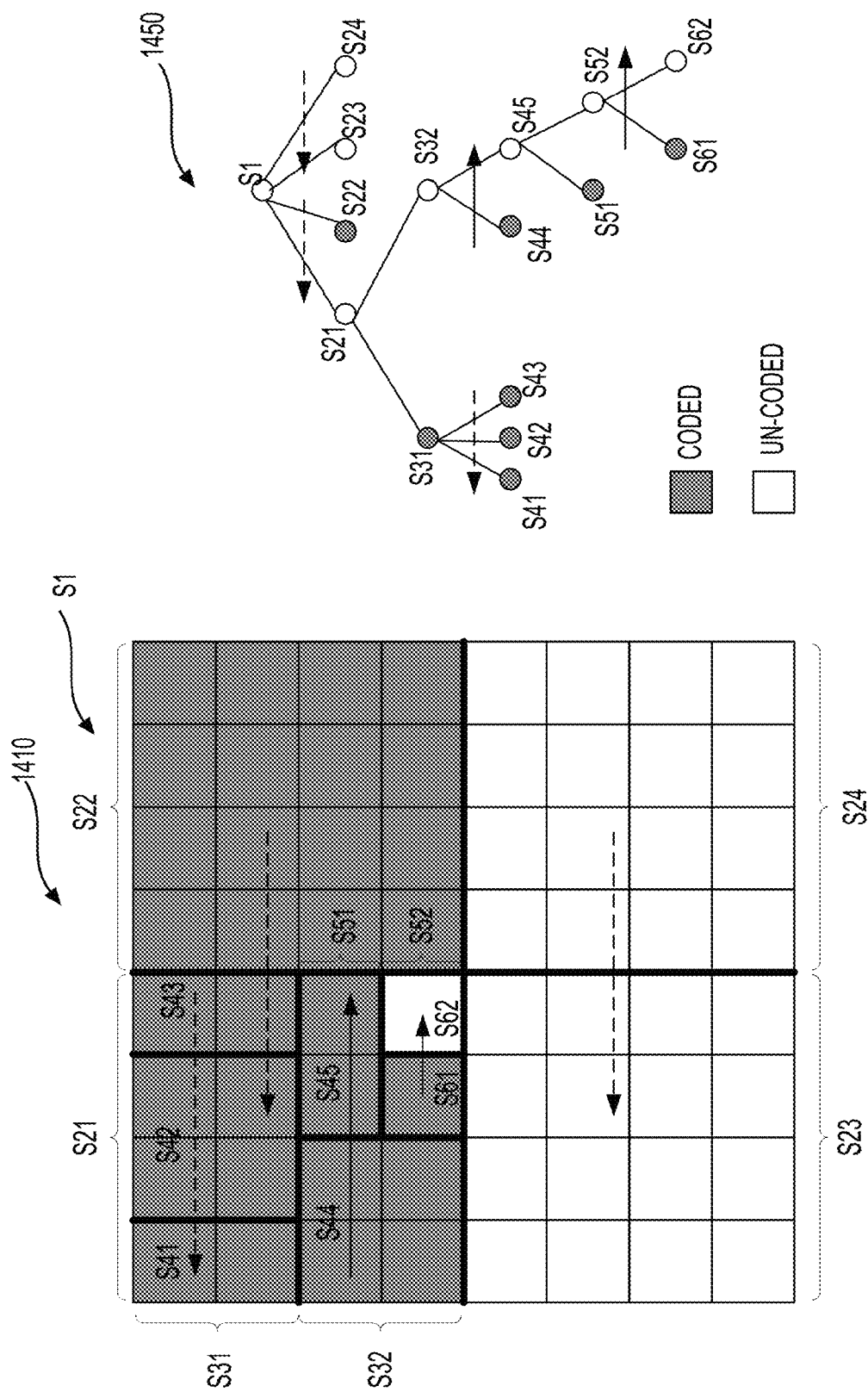
FIG. 14 shows an example of split unit coding order in a coding tree unit.

FIG. 14 shows an example of SUCO in a CTU. In the FIG. 14 examples, a CTU 1410 is partitioned according to a tree structure 1450. The CTU 1410 is also referred to as a unit S1. The unit S1 is partitioned into units S21-S24 according to QT structure, and coded in the R2L order. The unit S21 is horizontally partitioned into units S31-S32 according to BT structure. The unit S31 is vertically partitioned into units S41-S43 according to TT structure, and coded in the R2L order. The unit S32 is vertically partitioned into units S44-S45 according to BT structure and coded in the L2R order. The unit S45 is horizontally partitioned into units S51-S52 according to BT structure. The unit S52 is vertically partitioned into units S61-S62 according to BT structure and coded in the L2R order. In the FIG. 14 example, when a unit is further partitioned, the unit can be referred to as a split unit (SU). When a unit is not further partitioned, the unit can be referred to as a leaf CU.

In the FIG. 14 example, due to the flexible coding order in SU level, the neighboring availability of a leaf CU become more diverse than common left and above neighbors in HEVC. For example, there are four availability cases if only left and right neighboring blocks are considered. Specifically, for the first case that is referred to as LR_10, the left neighboring block is available and the right neighboring block is not available; for the second case that is referred to as LR_01, the left neighboring block is not available and the right neighboring block is available; for the third case that is referred to as LR_11, both of the left neighboring block and the right neighboring block are available; and for the fourth case that is referred to as LR_00, both of the left neighboring block and the right neighboring block are not available. The above block is always available unless the current CU lies on the top boundary of a slice. Availability of the above left or above right corner block depends on the corresponding left or right neighbor availability.

Usually, when the block coding order is from left to right and from top to bottom, the above and left areas of the current coding block can be the reference area with already reconstructed samples for intra picture block compensation. When SUCO is used, the coding order and neighboring reference sample availability become more complex. Aspects of the disclosure provide techniques to specify the available search range for intra block copy.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following description, the term block may be interpreted as a prediction block, a coding block, or a coding unit, i.e. CU.

In the examples that the block coding order is from left to right and from top to bottom, when a reference block's top left corner and bottom right corner are valid for intra block copy (meaning samples at these two locations have been reconstructed and conform to the restrictions for intra block copy, for example, inside the same tile/slice of the current coding block), then all samples of the reference block have been reconstructed and conform to the restrictions for intra block copy (for example, inside the same tile/slice of the current coding block) and the reference block is a valid block for intra block copy.

However, when SUCO is used, checking only the top left corner and the bottom right corner of a potential reference block is not enough, more valid checking points are used to determine the sample availability of potential reference block.

In the following description, some positions of the current coding block are referred, and some positions of a (potential) reference block are referred. For example, top left corner of current coding block is referred to as (Cur_TL_x, Cur_TL_y); the top-right corner of current coding block is referred to as (Cur_TR_x, Cur_TR_y); the bottom-left corner of current coding block is referred to as (Cur_BL_x, Cur_BL_y); the bottom right corner of current coding block is referred to as (Cur_BR_x, Cur_BR_y). The width of the current coding block is referred to as cbWidth and the height of the current coding block is referred to as cbHeight. The top left corner of reference block is referred to as (Ref_TL_x, Ref_TL_y); the top-right corner of reference block is referred to as (Ref_TR_x, Ref_TR_y); the bottom-left corner of reference block is referred to as (Ref_BL_x, Ref_BL_y); the bottom right corner of reference block is referred to as (Ref_BR_x, Ref_BR_y).

According to an aspect of the disclosure, when SUCO is used, for a current coding block, the right neighboring blocks may be coded prior to the left neighboring blocks. Thus, in some examples, even though both top left and bottom right corners of a reference block are valid, the entire block may still be an invalid reference block for intra block copy.

Figure 15:
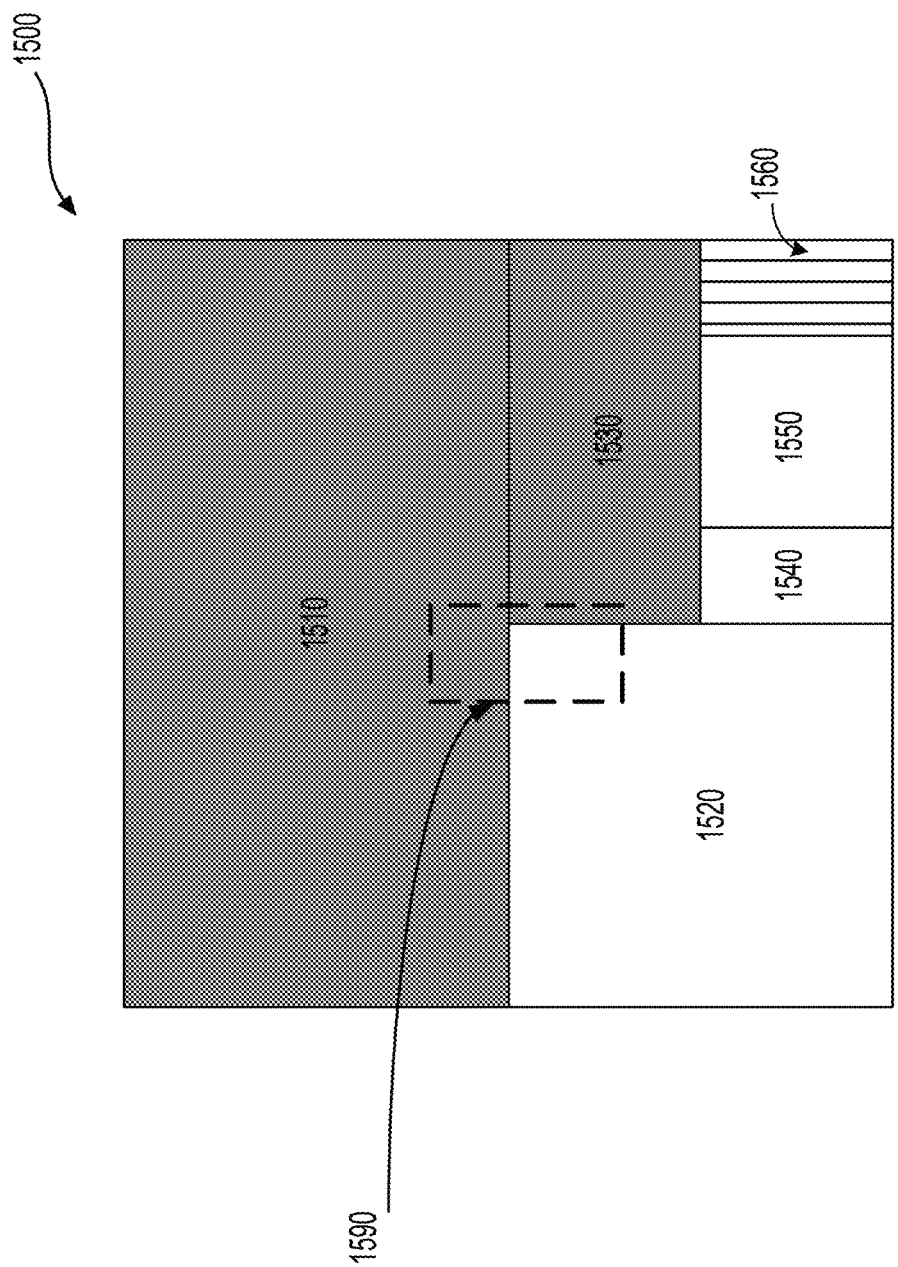
FIG. 15 shows an example illustrating that additional checking locations are needed according to some embodiments of the disclosure.

FIG. 15 shows an example illustrating that additional checking locations are needed according to some embodiments of the disclosure. In the FIG. 15 example, a CTU (1500) is partitioned into coding blocks (1510), (1520), (1530), (1540), (1550) and (1560). When SUCO is used, the coding blocks can be coded in an order of (1510), (1530), (1560), (1550), (1540) and (1520) in an example. In an example, at the time of decoding (or encoding) the coding block (1560), the coding block (1560) is the current coding block (shown with vertical stripes), the coding blocks (1510) and (1530) have been reconstructed (shown with grey color), and the coding blocks (1550), (1540) and (1520) haven't been reconstructed.

In the FIG. 15 example, at the time to code the current coding block (1560), a block vector points to a (potential) reference block (1590). Then, the reference block (1590) is checked. The top left and the bottom right corners of the reference block (1590) have been reconstructed. Thus, when only top left and the bottom right corners are checked, a wrong decision that the reference block (1590) is valid as a reference block for the current coding block (1560) may be made. However, as shown in FIG. 15, some portions of the reference block (1590) haven't been reconstructed, and the reference block (1590) is actually invalid.

To avoid using invalid reference block, or in another word, to make sure a selected reference block by the block vector is valid, in addition to the availability checks of top left and bottom right corners of the reference block, the reference block's bottom left corner, that is referred to as (Ref_BL_x, Ref_BL_y) is also checked to make sure the samples at that corner is valid for intra block copy reference (e.g., samples there should have been reconstructed, within the same tile/slice of current block, etc.). In the FIG. 15 example, when the bottom left corner is checked, the reference block (1590) can be determined to be invalid reference block.

According to another aspect of the disclosure, when SUCO is used, even when all four corners of a reference block have been reconstructed prior to the current coding block, the reference block can be invalid in some examples.

FIGS. 16A-16C show examples illustrating that additional checking locations are needed according to some embodiments of the disclosure. In the FIGS. 16A-16C example, a CTU (1600) is partitioned into coding blocks (1610), (1620), (1630), (1640), (1650) and (1660). When SUCO is used, the coding blocks can be coded in an order of (1610), (1620), (1630), (1670), (1650), (1660) and (1640) in an example. In an example, at the time of decoding (or encoding) the coding block (1660), the coding block (1660) is the current coding block (shown with vertical stripes), the coding blocks (1610), (1620), (1630), (1670) and (1650) have been reconstructed (shown with grey color), and the coding blocks (1640) hasn't been reconstructed.

In the FIG. 16A example, at the time to code the current coding block (1660), a block vector points to a (potential) reference block (1690A). Then, the reference block (1690A) is checked. The top left and the bottom right corners of the reference block (1690A) have been reconstructed. Thus, when only top left and the bottom right corners are checked, a wrong decision that the reference block (1690A) is valid as a reference block for the current coding block (1660) may be made. However, as shown in FIG. 16A, some portions of the reference block (1690A) haven't been reconstructed, and the reference block (1690A) is actually invalid.

Similarly, in the FIG. 16B example, at the time to code the current coding block (1660), a block vector points to a (potential) reference block (1690B). Then, the reference block (1690B) is checked. The top left and the bottom right corners of the reference block (1690B) have been reconstructed. Thus, when only top left and the bottom right corners are checked, a wrong decision that the reference block (1690B) is valid as a reference block for the current coding block (1660) may be made. However, as shown in FIG. 16B, some portions of the reference block (1690B) haven't been reconstructed, and the reference block (1690B) is actually invalid.

Also, in the FIG. 16C example, at the time to code the current coding block (1660), a block vector points to a (potential) reference block (1690C). Then, the reference block (1690C) is checked. The top left and the bottom right corners of the reference block (1690C) have been reconstructed. Thus, when only top left and the bottom right corners are checked, a wrong decision that the reference block (1690C) is valid as a reference block for the current coding block (1660) may be made. However, as shown in FIG. 16C, some portions of the reference block (1690C) haven't been reconstructed, and the reference block (1690C) is actually invalid.

To avoid using invalid reference block, or in another word, to make sure a selected reference block by the block vector is valid, in addition to the availability checks of top left and bottom right corners, a point on a center line of the reference block can be checked. In the FIGS. 16A-16C example, according to some embodiments, samples located at about a vertical center line (1680) (e.g., x=Ref_BL_x+ cbWidth/2) of the reference block can be checked. In an example, the reference block's bottom line center, that can be referred to as (Ref_BL_x+cbWidth/2, Ref_BL_y), can be checked in addition and make sure that a sample at that location is valid for intra block copy reference (e.g., samples at the location should have been reconstructed, within the same tile/slice of current block, etc.).

According to an aspect of the disclosure, the checking on the additional point(s) (besides the top left and the bottom right corners) for the availability condition check may be conditionally used. Thus, in some examples, only under certain circumstances, for example, the invalid reference blocks shown in FIGS. 16A-16C, will be possible, and then the additional point(s) may need to be checked.

In an embodiment, the conditions to enable the availability check of the additional point(s) can be: the reference block is entirely on top of current coding block, and the x component of the right edge of the reference block is larger than or equal to the x component of the left edge of the current coding block.

In another embodiment, the current coding block is a lower child partition from a horizontal BT split. A combination of the current block together with the upper child partition of the horizontal BT (belonging to the same parent node) is the middle partition of a vertical ternary TT split. The coding order for the TT split is from right to left. FIGS. 16A-16C show examples of such situation for the current coding block. In another embodiment, the additional checking point of the reference block availability check can be changed from position (Ref_BL_x+cbWidth/2, Ref_BL_y) another position: (Cur_TL_x−cbWidth/2, Ref_BR_y), which is located left at about half block width of the left edge of the current coding block, and is shown by (1681) in FIG. 16A.

According to some aspects of the disclosure, when SUCO is used, for a valid search range, the bitstream conformance requires the luma block vector mvL to obey the certain constraints. In an example, a current CTB is a luma CTB including a plurality of luma samples and a block vector mvL satisfies the following constraints for bitstream conformance when SUCO is used, and mvL represents the block vector in 1/16 resolution.

In some examples, first constraints are used to make sure that the reference block for the current block has been reconstructed. When the reference block has a rectangular shape, a reference block availability checking process can be implemented to check whether a top left sample, a bottom right sample of the reference block are reconstructed, and additional point(s) when SUCO is used. When SUCO is not used, if the top left sample and the bottom right sample of the reference block are reconstructed, the reference block is determined to have been reconstructed. When SUCO is used, if the top left sample, the bottom right sample of the reference block and the additional point(s) are reconstructed, the reference block is determined to have been reconstructed.

In some implementation examples, check-A and check-B are performed to respectively check the top left sample and the bottom right sample of the reference block.

In addition, in an embodiment, when SUCO is used, the reconstructed bottom left sample of the reference block should be available, to avoid invalid reference blocks as shown in FIG. 15. In some examples, a derivation process for block availability can be invoked, and the input to the derivation process includes the position of the bottom left sample of the reference block. For example, the current luma positon is set to be (xCb, yCb), and width of the current block and the reference block is denoted by cbWidth, the height of the current block and the reference block is denoted by cbHeight. Then, the position of the bottom left sample of the reference block is (xCb+(mvL[0]>>4), yCb+(mvL[1]>>4)+cbHeight−1). The position of the bottom left sample is input to the derivation process for block availability, when the output is TRUE, the bottom right sample of the reference block is reconstructed.

In another embodiment, when SUCO is used, the reconstructed vertical middle sample(s) of the reference block should be available, to avoid invalid reference blocks as shown in FIGS. 16A-16C. In some examples, a derivation process for block availability can be invoked, and the input to the derivation process includes the position of the bottom left sample of the reference block. For example, the current luma positon is set to be (xCb, yCb), and width of the current block and the reference block is denoted by cbWidth, the height of the current block and the reference block is denoted by cbHeight. Then, the position of the bottom center sample of the reference block is (xCb+(mvL[0]>>4+cbWidth/2), yCb+(mvL[1]>>4)+cbHeight−1). The position of the bottom center sample is input to the derivation process for block availability, when the output is TRUE, the bottom right sample of the reference block is reconstructed.

In some examples, check-C is modified to ensure that the reference block is to the left and/or above of the current block and/or to the right of the current block, does not overlap with the current block. The constraints for check-C can also include at least one of the following three conditions: 1) the value of (mvL[0]>>4)+cbWidth is less than or equal to 0, which indicates that the reference block is to the left of the current block and does not overlap with the current block; 2) the value of (mvL[1]>>4)+cbHeight is less than or equal to 0, which indicates that the reference block is above the current block and does not overlap with the current block; and 3) the value of (mvL[0]>>4) is greater than or equal to cbWidth, which indicates that the reference block is to the right of the current block and does not overlap with the current block.

Further, check-D, check-E, check-F, check-G, check-H and check-I can be similarly performed as described.

Figure 17:
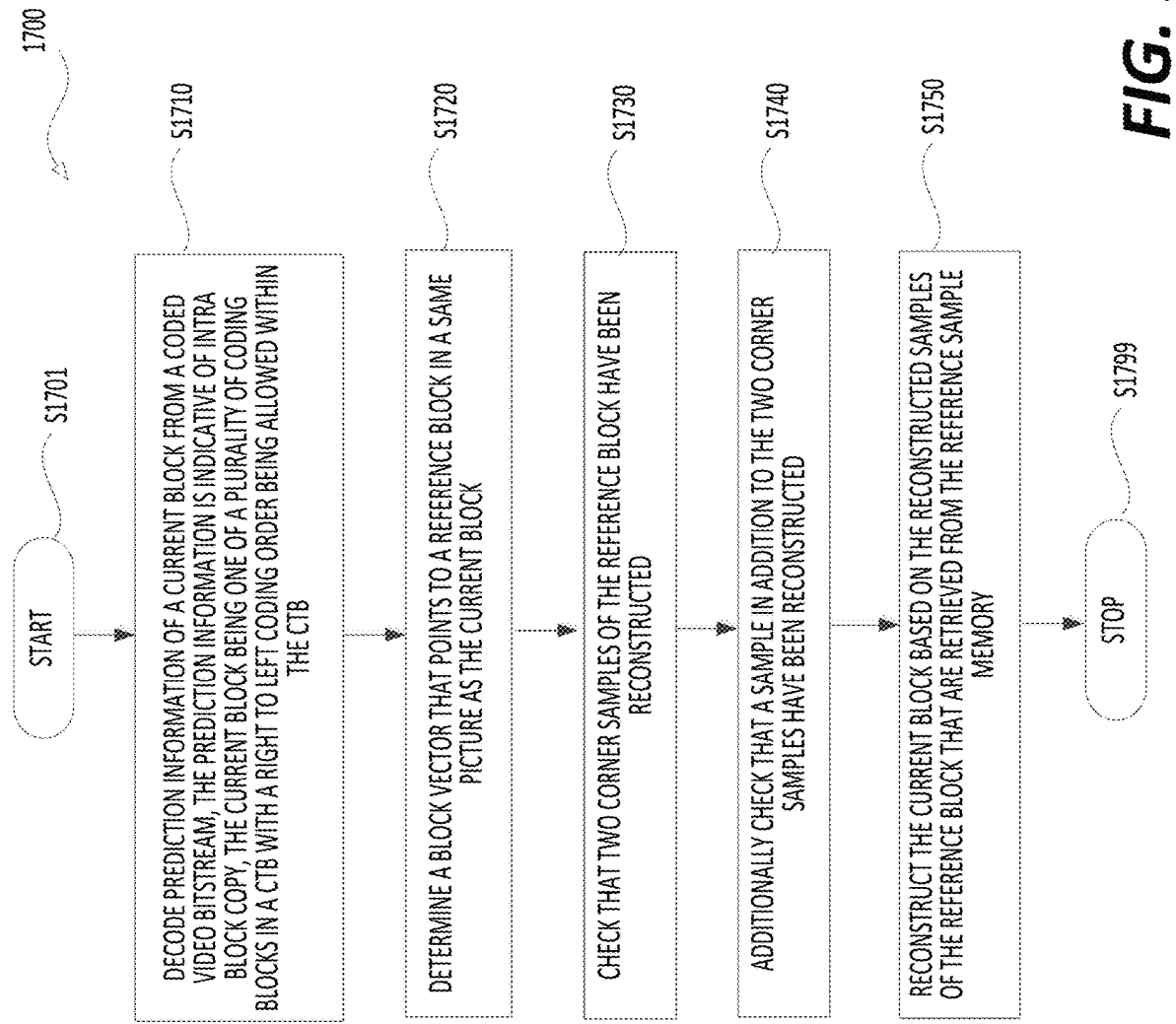
FIG. 17 shows a flow chart outlining a process example according to some embodiment of the disclosure.

FIG. 17 shows a flow chart outlining a process (1700) according to an embodiment of the disclosure. The process (1700) can be used in the reconstruction of a block, so to generate a prediction block for the block under reconstruction. In various embodiments, the process (1700) are executed by processing circuitry, such as the processing circuitry in the terminal devices (410), (420), (430) and (440), the processing circuitry that performs functions of the video encoder (503), the processing circuitry that performs functions of the video decoder (510), the processing circuitry that performs functions of the video decoder (610), the processing circuitry that performs functions of the video encoder (703), and the like. In some embodiments, the process (1700) is implemented in software instructions, thus when the processing circuitry executes the software instructions, the processing circuitry performs the process (1700). The process starts at (S1701) and proceeds to (S1710).

At (S1710), prediction information of a current block is decoded from a coded video bitstream. The prediction information is indicative of intra block copy mode. The current block is one of a plurality of coding blocks in a CTB with a right to left coding order being allowed within the CTB. For example, SUCO is used to enable flexible coding order in the CTB.

At (S1720), a block vector is determined. The block vector points to a reference block in a same picture as the current block.

At (S1730), two corner samples of the reference block are checked to be available. For example, check-A is performed to make sure that the top left corner sample has been reconstructed and check-B is performed to make sure that the bottom right corner sample has been reconstructed.

At (S1740), additional check is performed on a sample in addition to the two corner samples to make sure the sample has been reconstructed. In an example, the sample of additional check is a corner sample, such as a bottom left corner sample. In some examples, the sample of additional check is a non-corner sample. In an example, the sample of additional check is located about a vertical center of the reference block, such as bottom center sample of the reference block.

At (S1750), samples of the current block are reconstructed based on the reconstructed samples of the reference block. Then, the process proceeds to (S1799) and terminates.

It is noted that additional checks are performed to ensure that the reference block is a valid block, such as check-C, check-D, check-E, check-F, check-G, check-H, check-I and the like.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
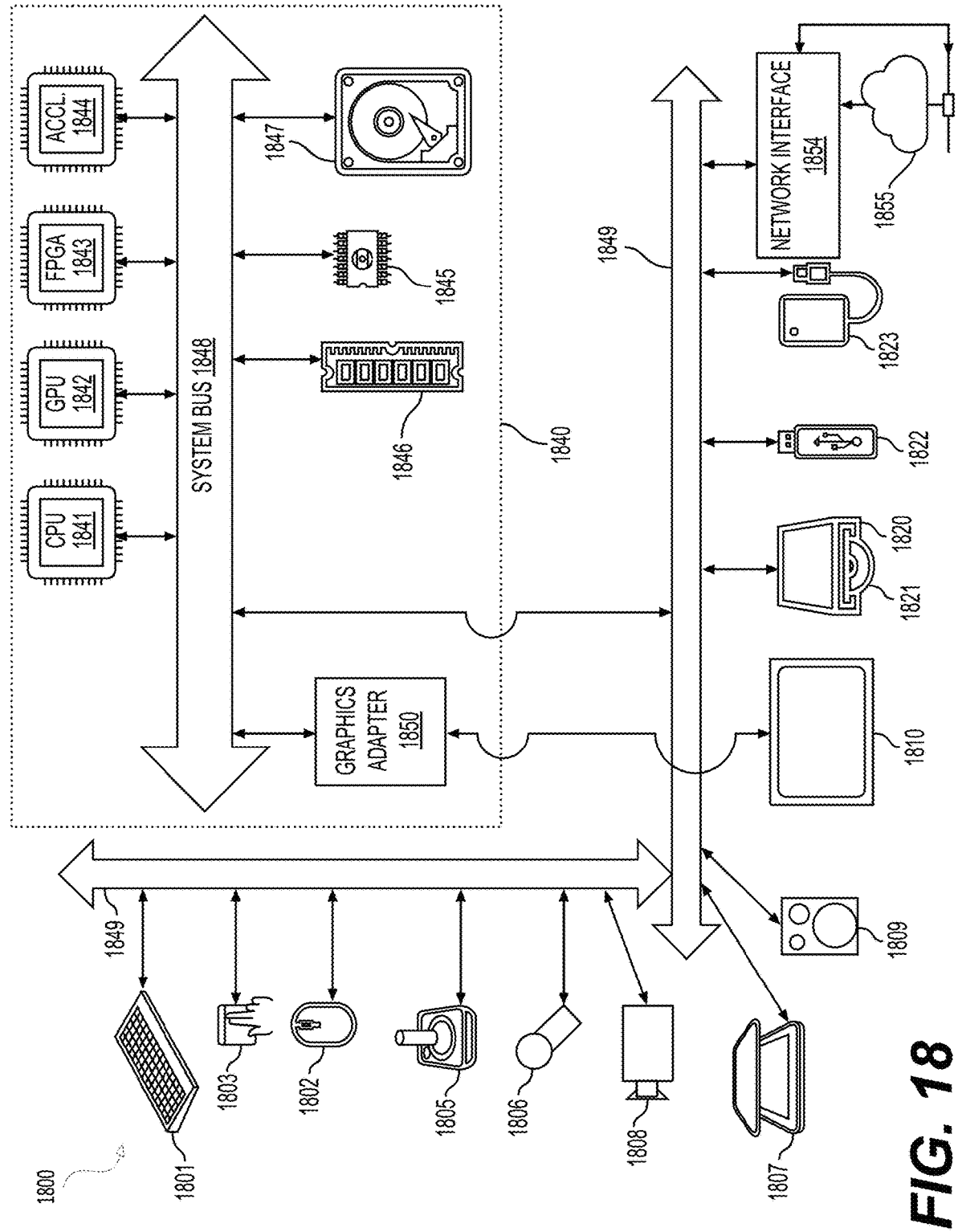
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding, comprising:
    determining, by a processor, a block vector that points to a reference block in a same picture as a current block in an intra block copy mode, the current block being one of a plurality of coding blocks in a coding tree block (CTB) with a right to left coding order being allowed within the CTB;
    checking, by the processor, that two corner samples of the reference block have been reconstructed based on first outputs from a derivation process for block availability, the derivation process for block availability generating the first outputs in response to positions of the two corner samples;
    checking, by the processor, that a non corner sample of the reference block has been reconstructed based on a second output from the derivation process for block availability, the derivation process for block availability generating the second output in response to a position of the non corner sample of the reference block; and
    encoding, by the processor, the current block based on reconstructed samples of the reference block after a determination that the two corner samples of the reference block and the non corner sample of the reference block have been reconstructed.

2. The method of claim 1, wherein the checking the non corner sample further comprises:
    checking that a sample located at about a vertical center of the reference block has been reconstructed based on the second output from the derivation process for block availability, the derivation process for block availability generating the second output in response to the position of the sample located at about the vertical center of the reference block.

3. The method of claim 2, wherein the checking the sample located at about the vertical center further comprises:
checking that a bottom center sample of the reference block has been reconstructed based on the second output from the derivation process for block availability, the derivation process for block availability generating the second output in response to the position of the bottom center sample of the reference block.

4. The method of claim 1, further comprising:
determining whether enable conditions are met; and
wherein the checking the non corner sample further includes checking, when the enable conditions are met, that the non corner sample of the reference block has been reconstructed.

5. The method of claim 4, wherein the enable conditions include
the reference block being entirely on top of the current block; and
a right edge of the reference block being on a right side of a left edge of the current block.

6. The method of claim 4, wherein the enable conditions include
the current block being a lower child from a horizontal binary tree split; and
a combination of the current block and an upper child from the horizontal binary tree split being a middle partition of a vertical ternary tree split.

7. The method of claim 1, wherein the checking the non corner sample further comprises:
checking that a sample located at a half block width left of a left edge of the current block has been reconstructed based on the second output from the derivation process for block availability, the derivation process for block availability generating the second output in response to the position of the sample at the half block width left of the left edge of the current block.

8. An apparatus for video encoding, comprising:
processing circuitry configured to:
determine a block vector that points to a reference block in a same picture as a current block in an intra block copy mode, the current block being one of a plurality of coding blocks in a coding tree block (CTB) with a right to left coding order being allowed within the CTB;
check that two corner samples of the reference block of the reference block have been reconstructed based on first outputs from a derivation process for block availability, the derivation process for block availability generating the first outputs in response to positions of the two corner samples;
check that a non corner sample of the reference block has been reconstructed based on a second output from the derivation process for block availability, the derivation process for block availability generating the second output in response to a position of the non corner sample of the reference block; and
encode the current block based on reconstructed samples of the reference block after a determination that the two corner samples of the reference block and the non corner sample of the reference block have been reconstructed.

9. The apparatus of claim 8, wherein the processing circuitry is configured to:
check that a sample located at about a vertical center of the reference block has been reconstructed based on the second output from the derivation process for block availability, the derivation process for block availability generating the second output in response to the position of the sample located at about the vertical center of the reference block.

10. The apparatus of claim 9, wherein the processing circuitry is configured to:
check that a bottom center sample of the reference block has been reconstructed based on the second output from the derivation process for block availability, the derivation process for block availability generating the second output in response to the position of the bottom center sample of the reference block.

11. The apparatus of claim 8, wherein the processing circuitry is configured to:
determine whether enable conditions are met; and
check, when the enable conditions are met, that the non corner sample of the reference block has been reconstructed.

12. The apparatus of claim 11, wherein the enable conditions include
the reference block being entirely on top of the current block; and
a right edge of the reference block being on a right side of a left edge of the current block.

13. The apparatus of claim 11, wherein the enable conditions include
the current block being a lower child from a horizontal binary tree split; and
a combination of the current block and an upper child from the horizontal binary tree split being a middle partition of a vertical ternary tree split.

14. The apparatus of claim 8, wherein the processing circuitry is configured to:
check that a sample located at a half block width left of a left edge of the current block has been reconstructed based on the second output from the derivation process for block availability, the derivation process for block availability generating the second output in response to the position of the sample at the half block width left of the left edge of the current block.

15. A non-transitory computer-readable storage medium storing instructions which when executed by a processor cause the processor to perform:
determining a block vector that points to a reference block in a same picture as a current block in an intra block copy mode, the current block being one of a plurality of coding blocks in a coding tree block (CTB) with a right to left coding order being allowed within the CTB;
checking that two corner samples of the reference block have been reconstructed based on first outputs from a derivation process for block availability, the derivation process for block availability generating the first outputs in response to positions of the two corner samples;
checking that a non corner sample of the reference block has been reconstructed based on a second output from the derivation process for block availability, the derivation process for block availability generating the second output in response to a position of the non corner sample of the reference block; and
encoding the current block based on reconstructed samples of the reference block after a determination that the two corner samples of the reference block and the non corner sample of the reference block have been reconstructed.

16. The non-transitory computer-readable storage medium of claim 15, wherein the checking the non corner sample further comprises:
checking that a sample located at about a vertical center of the reference block has been reconstructed based on the second output from the derivation process for block availability, the derivation process for block availability generating the second output in response to the position of the sample located at about the vertical center of the reference block.

17. The non-transitory computer-readable storage medium of claim 16, wherein the checking the sample located at about the vertical center further comprises:
checking that a bottom center sample of the reference block has been reconstructed based on the second output from the derivation process for block availability, the derivation process for block availability generating the second output in response to the position of the bottom center sample of the reference block.

18. The non-transitory computer-readable storage medium of claim 15, wherein the instructions further cause the processor to perform:
determining whether enable conditions are met; and
wherein the checking the non corner sample further includes checking, when the enable conditions are met, that the non corner sample of the reference block has been reconstructed.

19. The non-transitory computer-readable storage medium of claim 18, wherein the enable conditions include
the reference block being entirely on top of the current block; and
a right edge of the reference block being on a right side of a left edge of the current block.

20. The non-transitory computer-readable storage medium of claim 18, wherein the enable conditions include
the current block being a lower child from a horizontal binary tree split; and
a combination of the current block and an upper child from the horizontal binary split being a middle partition of a vertical ternary tree split.

* * * * *